(12) United States Patent
Mysore et al.

(10) Patent No.: US 12,184,480 B1
(45) Date of Patent: Dec. 31, 2024

(54) DETECTING AND MITIGATING NETWORK OPERATION VALIDATION ANOMALIES IN CONGLOMERATE-APPLICATION-BASED ECOSYSTEMS AND SYSTEMS AND METHODS OF THE SAME

(71) Applicant: Citibank, N.A., New York, NY (US)

(72) Inventors: Vishal Mysore, New York, NY (US); Sukhbir Singh, New York, NY (US); Ramkumar Ayyadurai, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/778,918

(22) Filed: Jul. 20, 2024

Related U.S. Application Data

(63) Continuation-in-part of application No. 18/435,947, filed on Feb. 7, 2024, which is a continuation of application No. 18/495,628, filed on Oct. 26, 2023, now Pat. No. 11,924,027.

(51) Int. Cl.
*H04L 41/069* (2022.01)
*H04L 41/16* (2022.01)
*H04L 41/22* (2022.01)

(52) U.S. Cl.
CPC ............ *H04L 41/069* (2013.01); *H04L 41/16* (2013.01); *H04L 41/22* (2013.01)

(58) Field of Classification Search
CPC ........ H04L 41/069; H04L 41/16; H04L 41/22
See application file for complete search history.

(56) References Cited

U.S. PATENT DOCUMENTS

| | | | |
|---|---|---|---|
| 9,842,045 B2 | 12/2017 | Heorhiadi et al. | |
| 11,475,321 B2 * | 10/2022 | Rangarajan | G06N 20/00 |
| 11,847,046 B1 * | 12/2023 | Ayyadurai | G06F 11/3684 |
| 11,924,027 B1 * | 3/2024 | Mysore | H04L 41/16 |
| 12,111,754 B1 * | 10/2024 | Mysore | G06F 11/3688 |
| 2005/0015624 A1 * | 1/2005 | Ginter | H04L 63/145 726/4 |
| 2020/0127973 A1 * | 4/2020 | Akyol | G05B 9/02 |
| 2022/0311681 A1 | 9/2022 | Palladino et al. | |

* cited by examiner

*Primary Examiner* — Dhairya A Patel
(74) *Attorney, Agent, or Firm* — Perkins Coie

(57) ABSTRACT

Systems and methods for improving the efficiency and accuracy of network operation validation anomaly detection in conglomerate-application-based ecosystems are disclosed. The disclosed anomaly evaluation platform can provide a first network operation to a first software application for generation of a second network operation, as in a flow-based processing system. The platform can generate a communication map that characterizes the architecture and/or performance of the system. In response to providing the communication map and the network operations to a validation model, the anomaly evaluation platform can determine a validation status and execute a corrective action to cure detected anomalies preventing validation of the network operation. As such, the anomaly evaluation platform enables dynamic monitoring, evaluation, and mitigation of detected anomalies in real-time and in a performance-dependent manner.

20 Claims, 11 Drawing Sheets

| Field 802 | Value 804 |
|---|---|
| Account | 923491 |
| Begin String | "MESSAGE 1" |
| Body Length | 3491 |
| Check Sum | 0 |
| Cumulative Quantity | 932.00 |
| Currency | United States Dollar |
| Last Price | 920.34 |
| Last Quantity | 932.00 |
| Price | 915.22 |
| Sending Time | 20240530-21:14:32.32 |

FIG. 8

| Anomaly Type 1002 | Priority Classification Indicator 1004 |
|---|---|
| New tag found in network operation | High |
| Length of tag above threshold | High |
| New last market observed | Low/Medium |
| New customer slang | Low/Medium |
| New country | Low/Medium |
| Commission charged exceed the threshold | High |

FIG. 10

DETECTING AND MITIGATING NETWORK OPERATION VALIDATION ANOMALIES IN CONGLOMERATE-APPLICATION-BASED ECOSYSTEMS AND SYSTEMS AND METHODS OF THE SAME

CROSS-REFERENCE TO RELATED APPLICATION

This application is a continuation-in-part of U.S. patent application Ser. No. 18/435,947 entitled "DETECTING NETWORK OPERATION VALIDATION ANOMALIES IN CONGLOMERATE-APPLICATION BASED ECOSYSTEMS SYSTEMS AND METHODS" and filed on Feb. 7, 2024, which is a continuation of U.S. patent application Ser. No. 18/495,628, now U.S. Pat. No. 11,924,027 entitled "DETECTING NETWORK OPERATION VALIDATION ANOMALIES IN CONGLOMERATE-APPLICATION-BASED ECOSYSTEMS SYSTEMS AND METHODS" and filed on Oct. 26, 2023. The content of the foregoing applications is incorporated herein by reference in their entirety.

BACKGROUND

Validating computing commands is currently a process that occurs as a last step of execution prior to obtaining a result. For example, when validating a login request, a computing system may compare a username and password to a stored set of username and password combinations. Where a match exists, the computing system may validate the login request, and enable a user access to one or more resources. However, as computing systems become more and more complex, the information passed between each system of the computing system may be modified. For example, in a chain of computing systems, a first computing system may modify an original message to be used as input for a second computing system. As the message has been modified, the second computing system may nonetheless process the message, only to determine that the message includes an error during a validation process, thereby wasting valuable computing resources (e.g., as the second computing system processed the erred message.

BRIEF DESCRIPTION OF THE DRAWINGS

FIG. 8 shows a schematic of a data structure representing a network operation, in accordance with some implementations of the present technology.

FIG. 10 shows a schematic of anomaly indicators including anomaly types and corresponding priority classification indicators, in accordance with some implementations of the present technology.

Figure 1:
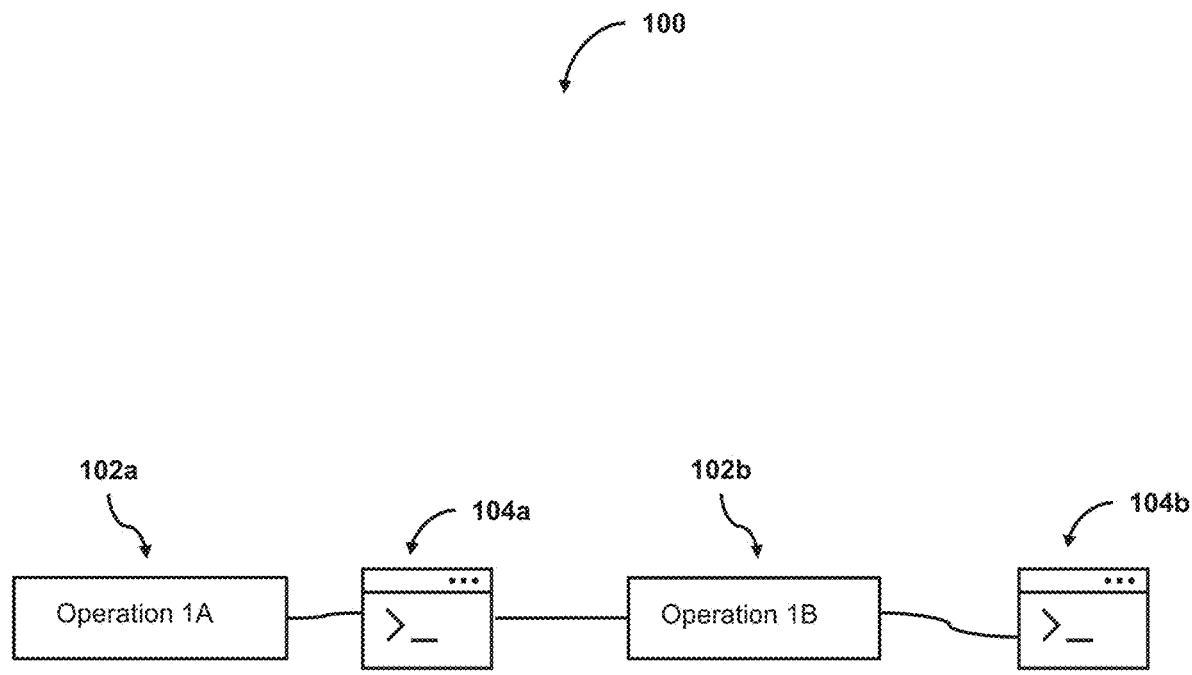
FIG. 1 is an illustrative diagram representing a conglomerate-application-based ecosystem processing a network operation, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity of modern computing systems, network operations may be modified as they pass from one computing system to another computing system. For instance, in the context of conglomerate-application-based ecosystems, a given system can include 20, 30, 40, or more different computing systems and/or software applications that a given network operation must "pass through" or be processed on. Each instance of where the given network operation may be processed by, passes through, or transmitted can introduce errors into the network operation. For example, where a first computing system (or software application) modifies a network operation, if done incorrectly, will effect each computing system or software application that is down-stream or parallel to the first computing system. As such, when a validation process is to occur (e.g., to verify the integrity of the network operation, to ensure that the data associated with the network operation is as intended, etc.), the network operation has passed through all computing systems, thereby wasting valuable computational resources (e.g., computer memory, processing power, processing cycles, and network bandwidth) that could otherwise have been used for other computational processes.

Existing systems have previously attempted to resolve such issues by utilizing computer and data scientists to manually review each computing system to determine where a validation error has occurred. However, such existing systems are practically infeasible to perform in real or near real time. For instance, modern day computing systems receive a large amount of data constantly. When performing a manual review of each computing system, let alone with respect to a given operation, the system must continue to run or otherwise face downtime, thereby decreasing the user experience (e.g., for those users who are using such systems) and increasing the amount of computing system down time.

Furthermore, as such systems are designed for speed to improve computational throughput, there is a lack of information available to check where, when, or how a validation error may have occurred. For example, existing systems do not currently have a mechanism to track how a modification to a network operation at an earlier system may effect another modification to a network operation at another system that is downstream from the earlier system. For example, as validation processes in existing systems occur after a network operation has been processed (e.g., to simply verify or authenticate the network operation after it has passed through all intended systems), an erred network operation has already been processed by each earlier system of the computing system based on the modified network operations before it, leaving little to no trace of where or how an error occurred. The only information that may be available are temporary log files that are removed from a computing system's storage in a short amount of time (e.g., 10 seconds, 1 minute, 1 hour, one day, etc.). When performing a manual review of these log files, the review may take days to weeks to even longer when detecting/diagnosing a system error or other validation anomalies. In connection with a temporary storage of log files, valuable information may be lost, and validation errors can continue to occur, negatively effecting the computing system and continuing to waste valuable computational resources.

For these and other reasons, there is a need for detecting network operation validation anomalies in real-time (or near-real time). There is a further need to store messages associated with a computing system's processing of a network operation. Furthermore, there is a need to track modifications to network operations across computing systems and their relation to such messages associated with a respective computing system's processing of the network operation. Lastly, there is a need to provide a real-time indication of a network operation validation anomaly at a given system within a computing system.

For example, as described above, existing systems have no (i) mechanism to store messages for later diagnostic review nor (i) mechanism to track modifications to network operations across computing systems and their relation to such messages. Without these mechanisms in place, computer scientists and data scientist like do not have adequate information available to them to diagnose a validation error. Not only may the lack of information cause hardship when determining where, when, or how a validation error has occurred, but given the sheer amount of information being received, transmitted, and processed by each system, attempting to determine such validation errors is a needle-in-a-haystack problem. Additionally, without a mechanism to provide a real-time indication of network operation validation anomalies (or network operation validation error), existing systems further waste valuable computational resources as erred network operations are able to pass from one system to another system, often undetected until it is too late.

To overcome these and other deficiencies of existing systems, the inventors have developed systems and methods for detecting network operation validation anomalies in conglomerate-application-based ecosystems. For example, the system can provide a first network operation to a first software application of a set of software applications, where (i) the first network operation is configured to be provided as input to the first software application and (ii) the first software application generates a second network operation as output, using the first network operation, to be provided to a second software application of the set of software applications. For a conglomerate-application-based ecosystem that is an ecosystem comprising a set of software applications, the system can track which software applications a network operation originates from, as well as which software applications a network operation is destined to be received at.

The system can receive a first message (e.g., a log file, metadata, a notification, etc.) that is associated with a processing of the first network operation at the first software application. For instance, the system receives the first message that indicates a set of characteristics associated with the processing of the first network operation to determine a validation process to be performed on the first message. That is, as opposed to existing systems that may merely validate an operation at the end of a given process, the inventors have developed a system that validates each network operation at each software application (or system) of a set of software applications (or systems). In this way, the system can determine in real time whether a validation anomaly has occurred, thereby reducing wasted computational resources (e.g., as an invalid network operation is not passed to other downstream systems). Moreover, by receiving such messages in relation to the processing of the network operation, the system provides a mechanism for tracking where, when, and how a given network operation validation anomaly may have occurred, thereby improving existing network operation validation detection methodologies.

The system can determine a validation process to be performed on the first message using (i) the first network operation, (ii) the second network operation, and (ii) the characteristics associated with the processing of the first network operation. For example, the system may compare the input and the outputs of the network operation being processed with respect to the first message to determine which validation process is to be performed on the first message. In this way, where multiple validation processes exist within an ecosystem (e.g., as each system may correspond to its own validation process), the system may maintain robustness and adaptability for detecting network operation validation errors. The system can also, in response to detecting that the determined validation process results in a failure to validate the first message, prevent the second network operation (e.g., the output from the first software application) from being provided to the second software application (e.g., a destined software application that receives the output from the first software application). In this way, the system further reduces the amount of wasted computational resources as error-prone or invalid network operations are not passed down to, or processed by downstream software applications.

In various implementations, the methods and systems described herein can reduce wasted computational resources by detecting network operation validation anomalies in conglomerate-application-based ecosystems. For example, the system may provide a first network operation to a first software application of a set of software applications, where the first network operation is configured to be provided as input to the first software application and (ii) the first software application generates a second network operation as output, using the first network operation, to be provided to a second software application of the set of software applications. The system can receive a first message associated with a processing of the first network operation at the first software application, where the first message indicates a set of characteristics associated with the processing of the first network operation. The system can determine a validation process to be performed on the first message using identifying information associated with the first software application. The system can perform the determined validation process on the first message using (i) the first network operation, (ii) the second network operation, and (iii) the characteristics associated with the processing of the first network operation. In response to detecting that the determined validation process results in a failure to validate the first message, the system can prevent the second network operation from being provided to the second software application of the set of software applications. Moreover, in existing anomaly validation systems, validation processes and associated detectable errors are determined by rigid, pre-defined rules, such as those programmed or coded into the system architecture. For example, to update such rules, an administrator system modifies validation processes or associated algorithms according to any changes in validation guidelines or schemes. As such, such pre-existing validation systems can lack the ability to adapt to changing system conditions over time, such as novel vulnerabilities or errors due to drifting inputs. For example, a software application generates a novel, previously unseen error due to a change in system-wide user activity, thereby leading to the possibility of anomalies that an existing validation system has not previously encountered. As such, existing anomaly validation systems can generate errors due to an inability to adapt to changing system conditions and vulnerability information.

In some cases, the nature, severity, and/or presence of anomaly depends on the associated system's architecture. To illustrate, the presence or nature of an anomaly can dynamically depend on which nodes or software applications of a system are associated with messages or network operations at a given time, due to the complexity of interdependencies, operational sequences, and/or linkages between different components of the system. As such, without real-time information relating to relationships between various nodes, software applications, or validation rules associated with the system, existing anomaly detection methods fail to accurately detect, evaluate, or respond to errors, anomalies, or vulnerabilities within a given network.

Moreover, detected anomalies, errors, or vulnerabilities occurring at run-time can be caused by or depend on the concurrent system performance. For example, anomalies can arise due to particular nodes of a network of devices that run out of memory or deplete other relevant computational resources. Pre-existing anomaly detection and mitigation platforms do not account for information relating to the current system state associated with an affected node or software application, as well as other related or connected nodes. As such, pre-existing anomaly detection platforms struggle to adapt to changing resource usage over time associated with the system in evaluating the severity of, as well as correcting, detected anomalies.

Furthermore, pre-existing anomaly detection systems do not natively prioritize addressing detected anomalies. For example, pre-existing anomaly detection systems do not evaluate or determine contextual information associated with the system prior to determining an order in which to evaluate or correct such anomalies, requiring manual or rule-based prioritization. In some cases, a failure of a network operation associated with a large quantity of data or resources requires more aggressive mitigation than a network operation associated with a smaller quantity of data or resources. Additionally or alternatively, pre-existing systems do not determine an order in which to mitigate detected anomalies on the basis of system-wide performance. As such, such systems are susceptible to addressing detected anomalies that are unlikely to have large-scale system effects (e.g., knock-on effects) over anomalies that are potentially more harmful or more likely to have further downstream system effects, thereby decreasing the effectiveness of anomaly mitigation.

To overcome these and other deficiencies of existing systems, the inventors have developed further systems and methods for detecting and mitigating network operation validation anomalies (e.g., in conglomerate application-based ecosystems). For example, the system detects the transmission of a first message from a first, originating software application to another software application, which can process the first message to generate a second message that is intended for transmission to a third software application. Such a message can include a network operation, token, or another piece of data in a multiple-step process (e.g., associated with cryptography-based operations). The disclosed anomaly evaluation platform enables the evaluation of the software applications' outputs (e.g., the second message) based on the associated inputs (e.g., the first message) and information relating to the system, for detection, evaluation, and correction of any detected anomalies.

In order to determine information relating to the system's state and associated linkages, relationships, or connections, the anomaly evaluation platform can monitor a network operation database to generate a communication map associated with the system. For example, the communication map includes an indication of relationships between software applications of an associated network (e.g., nodes of a system). Such relationships can include parent-child relationships associated with a chain of operations. In some implementations, the communication map includes an indication of relationships between validation rules for components of the system, where such validation rules are associated with anomaly detection criteria. By dynamically monitoring a network operation database to generate, regenerate, and/or update a communication map, the anomaly evaluation platform enables evaluation of anomalies in the context of other relevant system components. Furthermore, by dynamically updating such communication maps, the anomaly evaluation platform can collect real-time information associated with the system, improving the accuracy and efficiency of anomaly detection and evaluation.

Based on the communication map, the inputs and the outputs, the anomaly evaluation platform can generate a validation status that indicates the validity of the second message and the associated software application. For example, the anomaly evaluation platform can provide the first message, the second message, and the communication map to a validation model (e.g., an artificial intelligence model, such as a transformer-based large language model (LLM)). Based on detecting anomalies in the second message (e.g., in light of the first message and the relationships between associated software applications used to process such messages), the anomaly evaluation platform can determine anomalies, errors, or other discrepancies and generate a validation status that includes a severity or a risk level for such detected anomalies. In some implementations, the anomaly evaluation platform determines the severity or risk level based on system information or information associated with the inputs or outputs, such as a context or application associated with the corresponding messages. By doing so, the anomaly evaluation platform enables further mitigation or review of the anomalies in a priority-sensitive manner.

Based on the validation status, the anomaly evaluation platform can determine whether to process the second message with the target software application (e.g., the third software application). For example, the anomaly evaluation platform can determine, based on the validation status, that there are no detected severe anomalies; based on such a determination, the anomaly evaluation platform can determine to transmit the second message to the third software application for further processing, thereby enabling dynamic evaluation of anomalies.

Additionally or alternatively, the anomaly evaluation platform determines whether one or more of the anomaly indicators associated with the validation status indicate a corresponding "high" or "medium" severity level. Based on such a determination, the anomaly evaluation platform can determine not to process the second message with the third software application to prevent the propagation of high-risk anomalies, thereby mitigating further anomalies within the system. For example, the anomaly evaluation platform executes a corrective action to dynamically intervene in the system to correct the anomaly. To illustrate, the anomaly evaluation platform can update the second software application (e.g., using a patch) to generate an accurate second message in response to the first message in a case where an anomaly is detected within a field of the second message. In some implementations, the anomaly evaluation platform can generate and/or transmit an anomaly detection report to an associated administrator system for further review of the detected anomaly and/or to enable manual intervention.

In some implementations, the anomaly evaluation platform trains the validation model using historical data associated with network operations and/or software applications within the system. For example, the anomaly evaluation platform trains the validation model using training data that includes previous network operations (e.g., messages sent between software applications of the system), as well as computational resource usage for the system. By doing so, the anomaly evaluation platform enables the validation model to generate more accurate, system performance-sensitive anomaly detection and corresponding prioritization based on the historical functioning of the system. In some implementations, the anomaly evaluation platform can update the training data using updated training data (e.g., by updating the training data with new network operations), thereby effectuating continual learning of the anomaly evaluation platform, such that the platform can adapt to newly discovered errors, anomalies, or system performance states.

As such, the disclosed anomaly evaluation platform enables real-time validation of network operations (e.g., messages) based on a validation model that is trained on historical data. Moreover, the anomaly evaluation platform can leverage a dynamic, comprehensive view of the system as a whole (e.g., using a communication map) to improve the accuracy, relevance, and evaluation of detected anomalies and their corresponding severity or risk. For example, based on the communication map, the anomaly evaluation platform can provide network-level validation information to administrator systems in an interactive, easy-to-understand visualization of the communication map (e.g., via an associated graphical user interface (GUI)). Based on the message-level and system-level information, the anomaly evaluation platform enables flexible, tailored prioritization and correction of anomalies associated with a validation process, thereby improving the accuracy, efficiency, and robustness of the associated network or system.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is an illustrative diagram representing a conglomerate-application-based ecosystem processing a network operation, in accordance with some implementations of the present technology. For example, a conglomerate-application-based ecosystem 100 can include a network operation 102 (e.g., or collectively referred to as network operations 102a-102b), software application 104 (e.g., or collectively referred to as a set of software applications 104a-104b), or other components. The conglomerate-application-based ecosystem 100 can provide a first network operation 102a to a first software application 104a of a set of software applications. Second network operation 102b can be the result of processing first network operation 102a at the first software application 104b, where second network operation 102b is to be received as input to second software application 104b. In some implementations, conglomerate-application-based ecosystem 100 can include more or less network operations and software applications. For purposes of brevity and for understanding, the conglomerate-application-based ecosystem is shown at a micro-level to avoid confusion. A macro-level view of the conglomerate-application-based ecosystem may include 3, 4, 5, . . . , 10, . . . , 100, . . . , 1000 or more software applications or network operations.

A network operation (e.g., first network operation 102a) can be any operation that is to be processed by, transmitted to, provided to, or is related to one or more software applications. For example, a network operation may be any piece of data, that when processed by a software application, results in an output. In some implementations, a network operation, when processed by a software application, may result in another network operation being generated. For example, where a network operation is an email, and the software application is a white-space remover, the output of the white-space remover application can generate a second network operation (e.g., the email with all whitespace removed). As another example, where a network operation is a capital market trade (e.g., a stock trade, a stock transaction, a security trade, a security transaction) and the software application is a response handler application (e.g., to route the capital market trade to another system), the output of the response handler may modify the capital market trade by updating a sender field, thereby generating a second network operation. As described below in relation to FIG. 8, a network operation can include one or more values associated with corresponding fields (e.g., tags).

In some implementations, a network operation is stored within a network operation database associated with the ecosystem. For example, a network operation database includes a collection of network operations (e.g., data therein), associated timestamps (e.g., corresponding to the creation time of the network operations), and/or other information associated with the system (e.g., a system state characterizing system performance at the time of the network operation). In some implementations, the network operation database includes indications of detected anomalies for stored network operations. A network operation database can store historical and/or contemporary (e.g., dynamically generated) data associated with network operations. As such, the network operation database enables the disclosed anomaly evaluation platform to detect, evaluate, and mitigate anomalies associated with network operations using the context of previous network operations (e.g., including associated anomalies), thereby improving the resilience, accuracy, and application-specific capabilities of anomaly detection, evaluation, and mitigation.

A software application (e.g., first software application 104a) can be any software application configured to process input data (e.g., a network operation). For example, a software application can be any computer program that carries out a task, such as manipulating text, numbers, audio, graphics, or other input data. As another example, a software application may be a microservice software application. In some implementations, a software application can modify an input network operation and generate an output network operation. For instance, a software application can receive, as input, a first network operation. The software application can process the first network operation (e.g., using one or more instructions, rules, etc., that is associated with the software application) and cam generate a second network operation (e.g., an output). The second network operation can be a modified network operation (e.g., a second network operation). However, in some implementations, the software application may process a network operation such that the network operation is not modified. For example, the software application may validate information included in, or part of, a first network operation and may produce an output (e.g., a second network operation) that matches the input network operation (e.g., the first network operation), in accordance with some implementations of the present technology.

In one use case, where the conglomerate-application-based ecosystem 100 is a Capital Market Software system, each software application (e.g., software application 104a, software application 104b, etc.) can be software designed to facilitate one or more functionalities involved with processing a capital market trade. For example, first network operation 102a may be a capital market trade that is to be completed. First network operation 102a may be transmitted to first software application 104a of a set of software applications 104a-104b. To facilitate the trade, the capital market trade (e.g., first network operation 102a) may pass through or be processed by one or more software applications. For instance, first software application 104a may receive the first network operation 102a as input, and may generate an output (e.g., second network operation 102b). The second network operation 102b can be related to first network operation 102a (e.g., as second network operation 102b originated from a processing of the first network operation 102a at the first software application 104a). For example, the second network operation 102b may include information that may match, or be a modified version of first network operation 102a. Second network operation 102b may be destined for input to second software application 104b (e.g., to facilitate the capital market trade).

In such a Capital Market Software system-context, however, ensuring the integrity of capital market trades is an arduous task that involves multiple software applications, systems, or other components. For instance, throughout the lifecycle of a given capital market trade, the trade may pass through or be processed by trading platforms (e.g., third party trading platforms), order management systems, trading algorithm models, post trade clearing and settlement systems, risk management tools, market data systems, compliance and regulatory reporting applications, or more. In some implementations, such platforms, systems, models, tools, and applications may be represented by one or more of the set of software applications 104a-104b. However, it should be noted, that for sake of clarity, FIG. 1 shows two software applications.

In the context of such Capital Market Software systems, compliance with industry regulations, ensuring that trades are facilitated accurately (e.g., without error), and are facilitated in real-time (or near-real time) is of the upmost importance. However, existing systems currently fail by not having the proper validation techniques in place. For example, currently, when a trade is facilitated, a validation process (or authentication process) only occurs at the end or near the end of the trade. That is, existing systems rely on the completion of a trade to validate one or more values (e.g., amounts, timestamps, etc.) are valid with respect to the original trade.

Contributing to this issue, existing systems currently lack sufficient information to accurately diagnose a trade validation issue. For example, although existing systems may have access to raw data being transmitted and processed among a set of systems (e.g., software applications), this raw data is not easily understood due to an amount of financial and regulatory data included therein. As capital market systems process hundreds of thousands trades per day, manually parsing and analyzing this sheer amount of raw data is infeasible for the human mind to analyze and is error prone as such analytics rely on the mere opinion of computer and data scientists attempting to determine a network operation validation anomaly.

However, to combat these issues, the conglomerate-application-based ecosystem provides a mechanism for performing a validation process at each software application that is part of the conglomerate-application-based ecosystem. For example, for each software application of the set of software applications (e.g., software applications 104a-104b), a corresponding validation process may be performed on (i) an input network operation to a given software application, (ii) an output network operation from the processing of the given software application, and (iii) a message that is associated with the processing of the input network operation at the given software application. In this way, the system performs a validation process at each instance that a network operation is provided to a software application, thereby providing the ability to detect network operation validation anomalies in real time.

Moreover, the conglomerate-application-based ecosystem can store each message that is associated with the processing of a network operation at a given software application. For example, where the message is a log message that indicates characteristics associated with the processing of the network operation, the system may store each log message in association with (i) an input network operation, (ii) a software application, and (iii) the output network operation. In this way, the system may provide traceability of each microtransaction (e.g., each network operation) that occurs within a computing system for detecting network operation validation anomalies.

Furthermore, the conglomerate-application-based ecosystem may not only provide an indication to a user (e.g., a computer scientist, a stock broker, a data scientist, etc.) that a given network operation (e.g., a trade) has failed to be validated at some point within the conglomerate-application-based ecosystem, but also prevent a network operation from being provided to a downstream software application. For example, where the conglomerate-application-based ecosystem determines that a validation process results in a failure to validate a message (e.g., a log file) associated with the processing of the first network operation 102a at the first software application 104a, the system can prevent the second network operation 102b from being provided to (e.g., transmitted to) the second software application 104b. In this way, the system reduces the amount of wasted computational resources as a network operation that has failed to validate (or is otherwise associated with an error) is not passed on to downstream computing systems/software applications. By doing so, the system can provide real-time notifications to users and can provide real-time network operation validation anomaly detection, thereby improving the user experience, decreasing system downtime, and providing enhanced software application/computing system analytics.

Suitable Computing Environments

Figure 2:
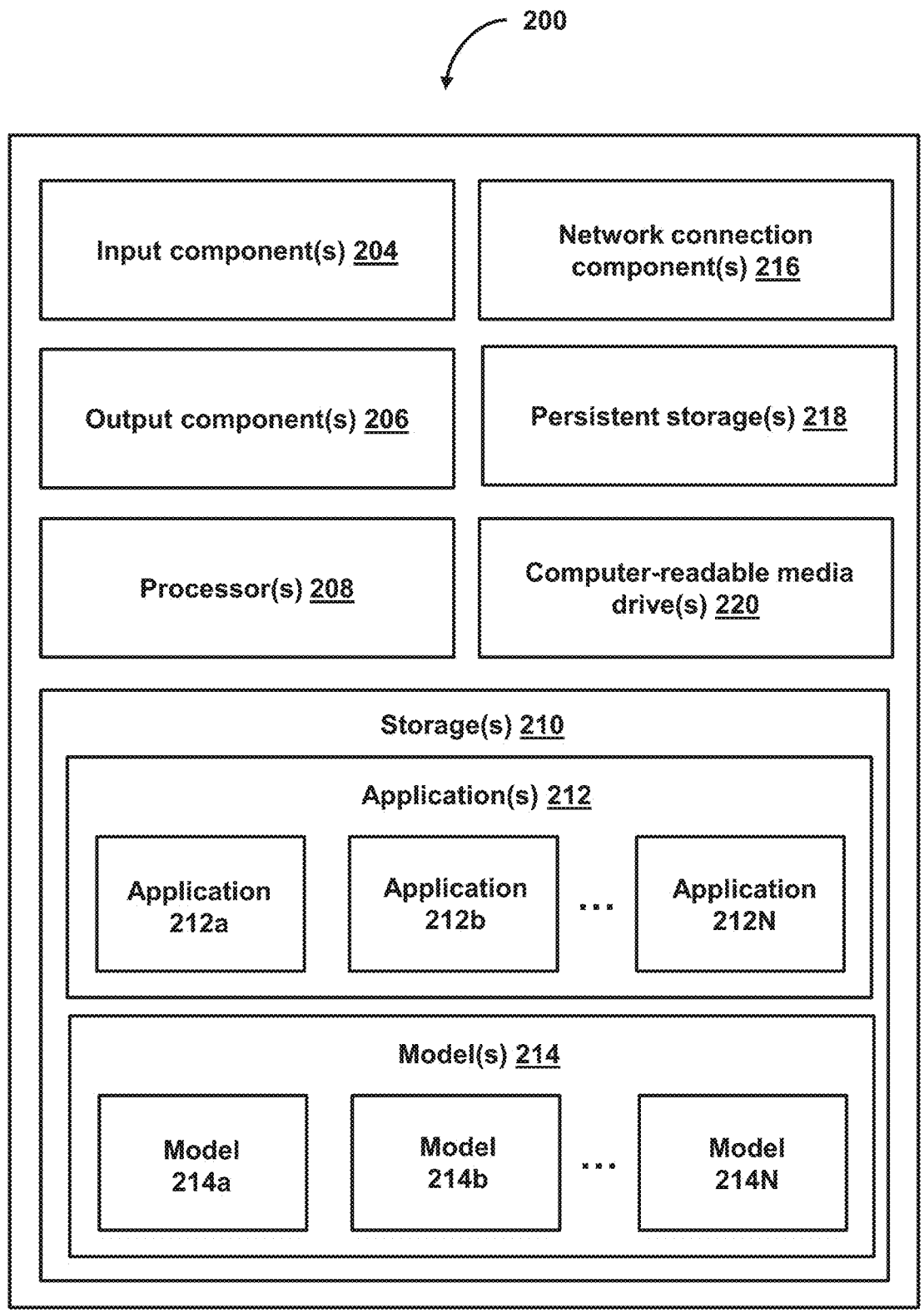
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system (e.g., the disclosed anomaly evaluation platform) operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214), and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
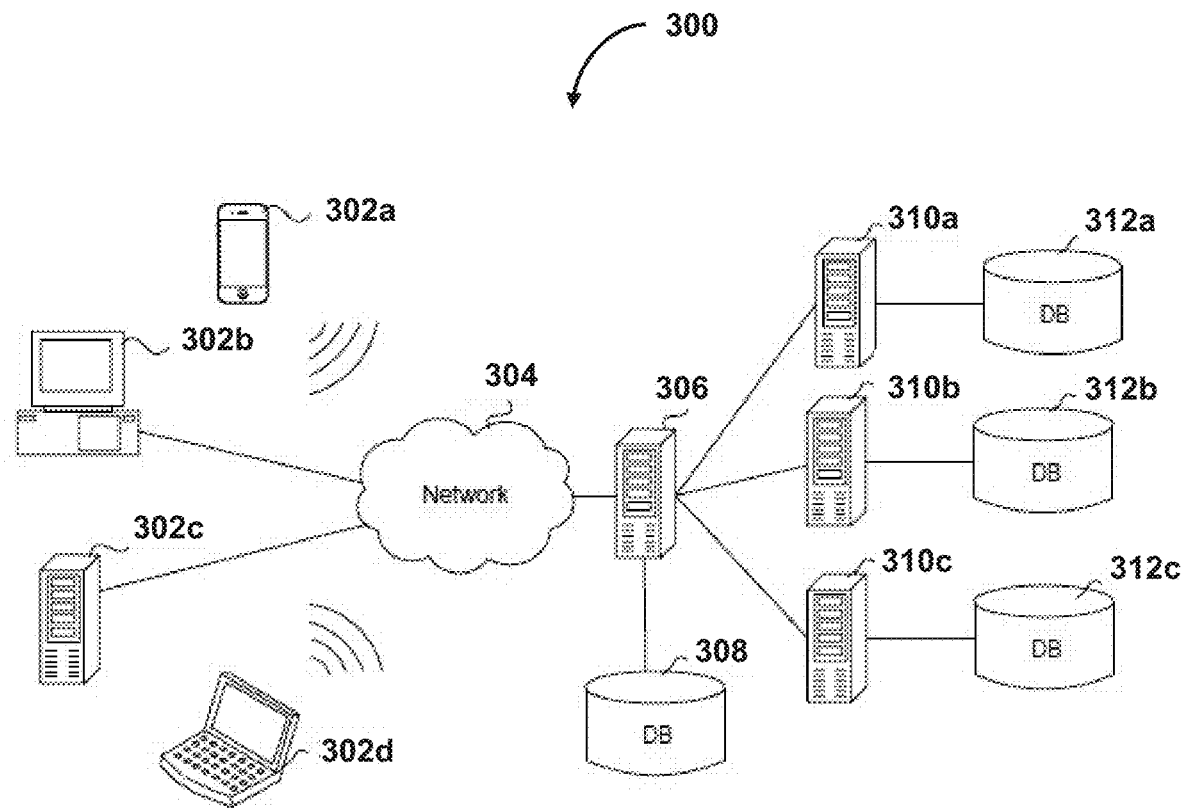
FIG. 3 is a system diagram illustrating an example of a computing environment in which the disclosed system operates in some implementations of the present technology.

FIG. 3 is a system diagram illustrating an example of a computing environment in which the disclosed system (e.g. the disclosed anomaly evaluation platform) operates in some implementations. In some implementations, environment 300 includes one or more client computing devices 302a-d, examples of which can host the conglomerate-application-based ecosystem 100 (or other system components). For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. For example, the server computing device 306 can include, house, or embody the disclosed anomaly evaluation platform. Additionally or alternatively, the anomaly detection platform resides in any computing components associated with environment 300, including one or more client computing devices 302a-d and/or one or more servers 310a-c (e.g., in a distributed architecture). In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server computing device 310 can correspond to a group of servers, and each of these servers can share a database or can have its own database. Databases 308 and 312 warehouse (e.g., store) information such as, predefined ranges, predefined thresholds, error thresholds, graphical representations, messages (e.g., notifications, log files, characteristics, etc.), validation processes, machine learning models, artificial intelligence models, sets of rules, linked set of rules, tags, historical messages, timestamps, identifiers (e.g., software application identifiers, validation process identifiers), validation process rules, or other information.

One or more of server computing devices (306, 310a-c) or client computing devices 302a-d can serve as nodes or devices (e.g., associated with software applications of the ecosystem 100). For example, a node includes a software or hardware component that includes one or more elements performing a particular function or hosting particular software components. For example a node can include a virtual representation of a particular software application (e.g., associated with different capital trade market software applications). Additionally or alternatively, nodes include devices (e.g., distributed across the ecosystem) that house such software applications. As such, one or more devices shown in FIG. 3 can serve as a node.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Detecting Network Operation Validation Anomalies

Figure 4:
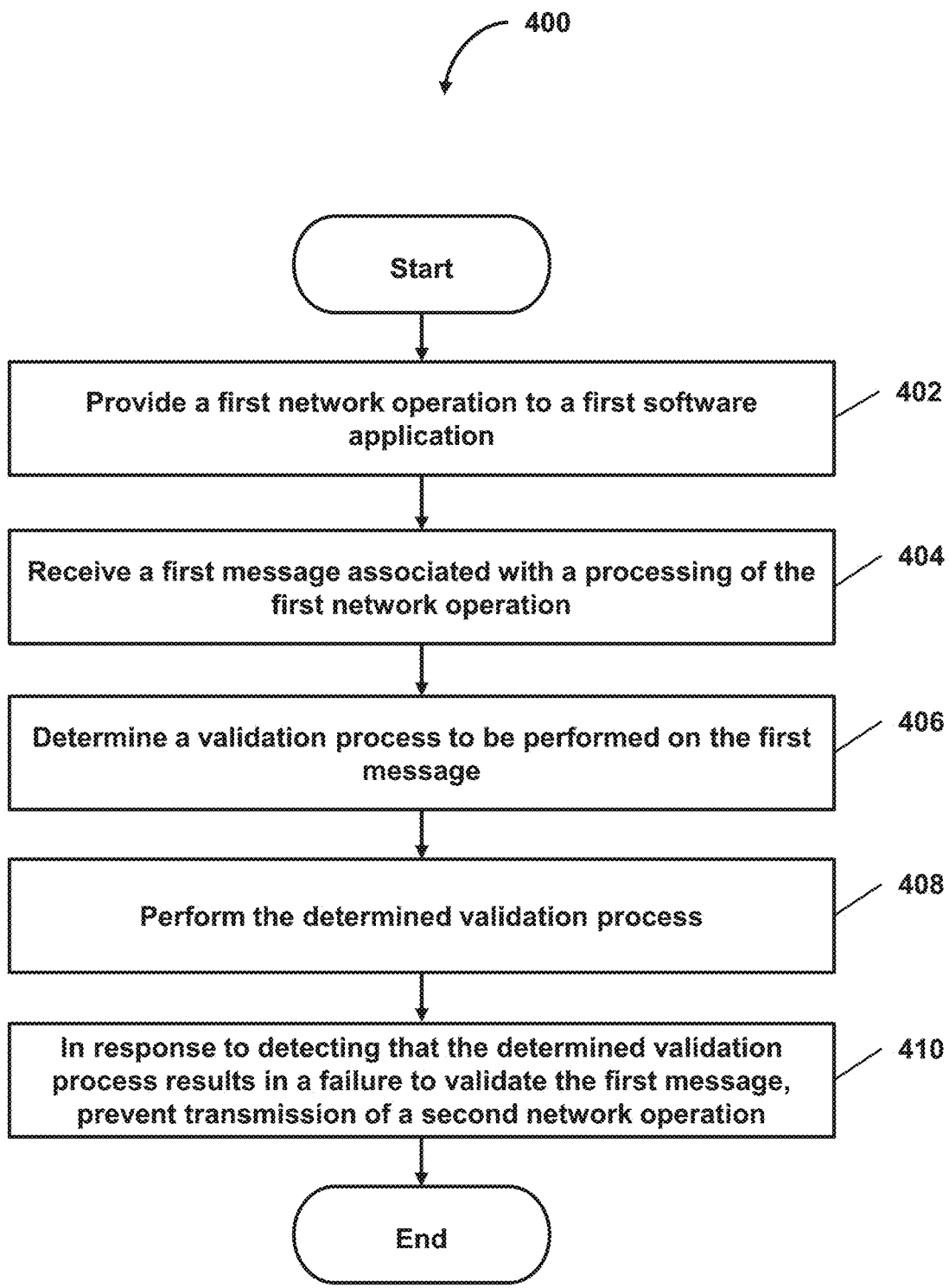
FIG. 4 is a flow diagram illustrating a process of reducing wasted computational resources by detecting network operation validation anomalies in conglomerate-application-based ecosystems, in accordance with some implementations of the present technology.

FIG. 4 a flow diagram illustrating a process (e.g., performed by one or more components associated with the anomaly evaluation platform) of reducing wasted computational resources by detecting network operation validation anomalies in conglomerate-application-based ecosystems, in accordance with some implementations of the present technology.

At act 402, process 400 can provide a first network operation to a first software application. For example, process 400 can provide a first network operation to a first software application of a set of software applications. The first network operation may be configured to be provided as input to the first software application, and the first software application can generate a second network operation as output using the first network operation. For example, the first network operation may be provided to a microservice software application involved in processing a capital market trade (e.g., transaction). The microservice software application may process the capital market trade (e.g., by updating one or more data fields (e.g., tags) associated with the trade, removing one or more data fields, or transforming one of more data fields). As a result of the processing of the first network operation, the system generates a second network operation. For example, the second network operation may be configured to be provided as input to a second software application. As an example, the second software application may be another software application that is part of the conglomerate-application-based ecosystem. In the context of capital market systems, the second software application may be a microservice software application that is configured to accept the second network operation as input.

In one use case, the first network operation can be an order (e.g., order for a capital market trade, a stock exchange, a security trade, etc.). The first network operation may include information such as a security type (e.g., a type of capital market asset being traded), a quantity (e.g., of how many shares of a given asset is to be traded, purchased, or sold), a price of the security or asset, or other information. Such information can be in the format of an Financial Information Exchange (FIX) protocol (e.g., a FIX message). For example, the FIX message may include a set of tags that represents the information associated with the first network operation (e.g., the security type, quantity, price, timestamp associated with the generation of the FIX operation, sender, target, order ID, etc.). As another example the FIX message may include tags such as mandatory tags, compliance tags, timestamp tags, repeating group tags, length tags, persisted tags, transformed value tags, or other tags.

Mandatory tags may be tags that are required to ensure proper FIX message processing and adherence to FIX protocol standards. Compliance tags may capture regulatory information (e.g., for regulatory/compliance analysis) or facilitating reports (e.g. financial reports). Timestamp tags may include a timestamp at which a given network operation was processed to synchronize timing events throughout a network operation's lifecycle (e.g., a given security trade). Repeating group tags may represent multiple instances of data (e.g., repeated tags, complex network operation formats, or combined tags). Length tags may indicate a length of a given data field or tag. For instance, as each tag is associated with a given value (e.g., a timestamp value, an identifier, a modification, etc.), the length tag may ensure that data associated with such tags are not truncated or corrupted. Persisted tags may include information that ensures data consistency across various stages. For example, persisted tags may be tags that do not change with respect to processing network operations that may be used as a "check" value. Lastly, transformed tags may include an indication as to which tags and which values associated with respective tags have been modified or updated based on a processing of a network operation at a given software application. In this way, the system uses such tags to validate network operations with respect to (i) a software application's processing of the network operation and (ii) an output of the software application (e.g., a second network operation) to ensure data integrity.

The first network operation can be provided to a first microservice software application for initial processing. For example, the first microservice software application may determine where the first network operation is to be routed. The first microservice software application can update one or more tags associated with the FIX message by processing the FIX message, and may generate an output (e.g., a second network operation) that is to be provided to a downstream software application (e.g., a second microservice software application). Such downstream software applications may refer to any software applications that are configured to receive data (e.g., FIX messages) that occur in succession. For instance, downstream software applications may refer to any software application that is configured to receive data from a prior software application.

In some implementations, process 400 can detect a transmission of a first network operation to a first software application of a set of software applications. For example, process 400 may receive an indication (e.g., a timestamp, a notification, a transmission message, etc.) that indicates that a network operation is, or has been, transmitted to a given software application. In this way, the system detects in real time, whether a network operation has been transmitted to one system (e.g., software application) to another system (e.g., another software application) to facilitate real-time detection of network operation validation anomalies.

At act 404, process 400 can receive a first message associated with a processing of the first network operation. For example, the first message may be a log file associated with the processing of the first network operation. The first message can be generated in response to the first software application processing the first network operation for use in validating one or more network operations. As an example, the first message may indicate a set of characteristics associated with the processing of the first network operation. The set of characteristics can include information pertaining to (i) an input network operation, (ii) a software application, (iii) an output network operation, or other information. As an example, the set of characteristics may include all of the information of the first network operation (e.g., FIX tags associated with the first network operation), the first software application identifier, a timestamp associated indicating what time the first software application processed the first network operation, the information of the second network operation (e.g., the FIX tags associated with the second network operation), or other information. The first message (e.g., a first log file) can include such information to validate one or more network operations. Additionally, the first message (e.g., the log file) may be in a XLM, JSON, FIX, or FIX4 format.

As FIX tags change constantly based on the processing of a FIX message at a given system or software application within the conglomerate-application-based ecosystem, log files may be generated by the software applications that process such FIX messages. The log files provide valuable information as to any inconsistencies amongst the FIX messages (e.g., when received as input, when generated as output), whether any timestamps associated with the processing of a FIX message is out of range of another FIX message, whether any errors are present within the software application (e.g., incorrectly modifying a FIX tag of an input FIX message), or other information. As an example, when FIX messages are passed through or passed to varying software applications within the conglomerate-application-based ecosystem, such FIX messages may undergo modifications such as the removal, updating, or addition of FIX tags within the FIX messages. As such, log files can be used for functional, regulatory, or compliance integrity analysis by capturing these changes and storing them in a database for later retrieval when a validation anomaly is detected.

For example, as opposed to existing systems which do not actively store such log messages for validation purposes (or in association with given software applications), process 400 stores such messages (e.g., log messages) in association with the software application to which processed a given network operation. For instance, even when existing systems store log files for later use, such log files are difficult to access based on the complexity of information stored within such files. To overcome this, the conglomerate-application-based ecosystem stores messages (e.g., log files) in association with the software application to which processed a given network operation for efficient retrieval. For example, the system may store a log message in a dictionary style database, where the key (e.g., for a key/value pair) is the software application identifier (e.g., a first software application identifier, a first microservice software application identifier) and the value is a log file identifier (e.g., a value indicating a timestamp at which the log file was created, a pointer to the log file that was generated based on the processing of the network operation, etc.). In this way, the system may reduce the utilization of computational resources by enabling a faster retrieval of the log file (e.g., as opposed to a parsing of all available log files stored in a database).

At act 406, process 400 can determine a validation process to be performed on the first message. For example, process 400 can determine the validation process to be performed on the first message using identifying information associated with the first software application. As an example, each software application of the set of software applications that are part of the conglomerate-application-based ecosystem can be associated with an identifier. The identifier may be an integer, decimal, hexadecimal, alphanumeric, string, or other value that is unique to a given software application. As each software application of the set of software applications can perform different processes (e.g., modify, add, remove FIX tags, generate multiple network operations from an input network operation, etc.), each software application may have a unique validation process to be performed on a given message.

For instance, process 400 can access a database indicating a set of validation processes. Each validation process of the set of validation processes may be a set of rules (e.g., predetermined validation rules) that uses information from (i) the first network operation, (ii) the first message (e.g., the log file generated from the processing of the first network operation at the first software application), or (ii) the second network operation. For example, the set of rules can use tag values from the first network operation and compare one or more tag values of the first network operation to one or more tag values in (i) the second network operation or (ii) the characteristics indicated in the first message.

As one example, a validation process can include a set of rules, a software application identifier, and one or more linked rules (e.g., to the current rule). For example, an exemplary validation process is shown below.

{Rule Name: "OMS-ALGO"
When
Condition
Then
Validate.ComplianceTags
Validate.MandatoryTags
Validate.TimeStampTags
Validate.Linked(Rule Name: ALGO-EXCHANGE, CurrentRuleTag, LinkedRuleTag)
ReportDashboard
End}

The software application identifier (e.g., "Rule Name" field) can correspond to the software application that processed a given network operation. The "When" field may indicate a condition as to the occurrence of the triggering of the validation (e.g., a time at which the validation process will execute). The "Condition" field can indicate a condition value of a conditional tag. The "Then" field indicates which Tags of a given network operation may be validated (e.g., checked for a matching, checked for integrity, etc.). The "Validate. Linked" filed may indicate another validation process that is to occur, as well as specified parameters to pass to the other validation process. As such, each validation process can be linked to (e.g., cause execution of) one or more other validation processes of the set of validation processes.

As the messages (e.g., first message, a log message, etc.) can include characteristics associated with the processing of a network operation (e.g., a first network operation) at given software application (e.g., the first software application), such as the tags of an input network operation (e.g., the first network operation), an identifier of a software application that processed the input network operation (e.g., the first software application), and the tags of an output network operation (e.g., the second network operation), process 400 may use the characteristics of the first message to perform the validation of the first message. In this way, for example, the system need not store each network operation (e.g., whether input nor output) to a given software application, but rather store log files generated based on the processing of the network operation to perform a validation process, thereby reducing the utilization of computer memory resources.

In some implementations, process 400 can determine a validation process to be performed by accessing a database configured to store a set of validation processes. For example, process 400 can identify that the first network operation originated from an originating software application and that the second network operation is to be provided to a destined software application using a format of (i) the first network operation and (ii) the second network operation. Each network operation (e.g., FIX message) may include a given set of tags (e.g., a format). For example, one FIX message may include Mandatory Tags, Compliance Tags, Regulatory Tags, and a Transformative Tag. However, another FIX message may include Mandatory Tags, Compliance Tags, and Regulatory Tags. As the FIX messages (e.g., network operations) are processed by varying software applications, the format of a given FIX message can indicate a software application that has processed, or will process a given FIX message. The system may then determine the validation process to be performed on the first message (e.g., the log message) by accessing a data structure configured to store a linked set of rules representing the validation process using an identifier associated with the originating software application and an identifier associated with the destined software application.

As an example, the originating software application may be a software application that has processed the first network operation, and the destined software application may be a software application that is to receive the second network operation. Process 400 can access a data structure based on an identifier associated with the originating software application and the destined software application to retrieve a validation process to be performed on the first message. The data structure may store a set of software application identifiers that are mapped to a given validation process. For example, the data structure may store a combination of software application identifiers (e.g., that indicate an originating software application and a destination software application) that are associated with a given validation process. In this way, the system may query the database to determine a validation process to be performed on the first message using the software application identifiers.

In some implementations, process 400 can determine the validation process to be performed on the first message based on a set of tags associated with the first message. For example, process 400 can extract, from the first message, a sender tag and a target tag, where the sender tag indicates an originating software application and the target tag indicates a destined software application. Process 400 may then identify that the first network operation originated from the originating software application using the sender tag and that the second network operation is destined to be provided to the destined software application using the target tag. Using the sender and target tags, Process 400 can access a data structure that is configured to store the set of validation processes, where each validation processes is mapped to a respective sender and respective target tags, to determine the validation process to be performed on the first message. For example, as discussed above, process 400 may query the database to determine a validation process to be performed on the first message, however, by using the tag values that are part of the first message (e.g., as opposed to the format of the first network operation or the second network operation).

At act 408, process 400 can perform the determined validation process. For example, process 400 can perform the determined validation process on the first message using (i) the first network operation, (ii) the second network operation, and (iii) the characteristics associated with the processing of the first network operation. For instance, process 400 may apply the validation process to the first message. As the validation process may be a set of rules (e.g., one or more rules, a set of linked rules, etc.), process 400 may extract one or more characteristics from the first message (e.g., the log file) to enable the validation process to validate one or more tag values (e.g., characteristics) of the first message. As another example, the validation process may be executed automatically and may compare one or more tag values of the first message. In some implementations, the validation process can compare corresponding tags (e.g., matching tags) between the first message, the first network operation, and the second network operation to provide a validation result (e.g., whether the first message is successfully validated, whether the first message has failed to successfully validate). In this way, the system determines whether a network operation is valid in real, or near-real time, thereby improving the user experience.

At act 410, process 400 can prevent the second network operation from being provided to the second software application in response to detecting that the determined validation process results in a failure to validate the first message. For example, as existing systems do not perform validation processes at each system (e.g., software application) a network operation may pass through or be processed by, one or more downstream systems until the network operation is completed. For instance, where a network operation involves 10 systems, if an error (e.g., a validation error, validation anomaly, etc.) occurs at an earlier system (e.g., systems 1-9), the error may not be detected until it reaches the $10^{th}$ system. This causes a waste of computational resources as each system has processed an error prone network operation. On the contrary, the conglomerate-application-based ecosystem may validate network operations at each system (e.g., software application, microservice software application) and can prevent a network operation from being transmitted to a downstream software application, thereby reducing the amount of wasted computational resources.

In some implementations, process 400 can enable the transmission of a network operation to another software application. For example, in response to the detection indicating a successful validation of the first message, process 400 can enable the second network operation to be transmitted to the second software application. For instance, where the first message is determined to be validated (e.g., no errors are present, no validation errors have occurred), process 400 can transmit the second network operation to the second software application for further processing. In this way, the system may reduce the amount of wasted computational resources as only network operations that are successfully validated are enabled to pass to a downstream system or software application.

In some implementations, process 400 can detect that the determined validation process results in a failure to validate the first message based on a missing characteristic. For instance, process 400 can determine a first characteristic of the set of characteristics of the first message. For example, the first characteristic may be a tag (e.g., a compliance tag, a mandatory tag, a transformative tag, a timestamp, etc.). Process 400 can then determine whether the second network operation comprises the first characteristic with respect to the first network operation using the linked set of rules (e.g., of a determined validation process). For example, the second network operation may include a timestamp tag that fails to indicate a timestamp value (e.g., a lack of a timestamp), and the first network operation may include a timestamp tag that indicates a second time. In response to the second network operation failing to comprise the first characteristic with respect to the first network operation, process 400 can detect that the determined validation process results in a failure to validate the first message (e.g., as the timestamp value is missing from the second network operation). As such, the system may invalidate the first message (e.g., the log file) based on a missing tag or missing tag value.

In some implementations, process 400 can generate an indication that a network operation has resulted in a failure to validate. For instance, although network operations may be validated at each system/software application, a current network operation being validated may have originated from another software application that is upstream (e.g., from an earlier system/software application). For example, an original network operation may be for a capital market trade. However, when passed through, or processed by the various software applications or other systems included in the conglomerate-application-based ecosystem, the trade may have been split up into 10 or more separate trades, each being processed by varying systems. As such, it is often difficult to provide an indication that an original network operation has failed to execute.

To overcome this however, as the messages (e.g., log messages) that are generated in response to a processing of network operations at each respective software application are stored in a database, process 400 may determine a set of historical messages, using the first message, where each historical message of the set of historical messages are associated with a processing of a respective network operation that is related to the first network operation. For example, where the first message has failed to be validated, process 400 may retrieve a set of historical messages (e.g., from the database) that are related to the first message.

Process 400 can determine the set of historical messages using the first message by extracting (i) a first network operation identifier associated with the first network operation and (ii) a third network operation identifier associated with a third software application that processed the third network operation to generate the first network operation. For example, process 400 may extract the first network operation identifier (e.g., a tag value that identifies the first network operation, an order ID, a trade ID, etc.) from the first message. Process 400 can also extract the third network operation identifier from the first message. For example, as the first message includes characteristics of a processing of the first network operation at the first software application, such as which software application the first network operation originated from (e.g., an upstream software application), process 400 can extract a third network operation identifier. The third network operation identifier may be an identifier that identifies a network operation that was processed by a software application that generated the first network operation. That is, the third network operation is a network operation that was generated prior to the generation of the first network operation.

Process 400 can then access a database storing the set of historical messages to parse the set of historical messages using (i) the first network operation identifier and (ii) the third network operation identifier to identify a first message of the second set of historical messages that corresponds to the first network operation identifier and the third network operation identifier. For example, process 400 can determine a log file that includes the identifier of both the third network operation identifier and the first network operation identifier. Process 400 may then determine the set of historical messages by adding the determined log file to the set of historical messages.

To clarify the above, where the set of historical messages is a set of historical log files generated based on the processing of each network operation at a given software application, each log file may include identifying information of each network operation that was processed at the given software application and the output that the processing of the network operation at the given software application generated. As such, process 400 can identify (i) the input network operation and (ii) the output network operation. Using this information, process 400 can iteratively check the set of historical log files based on the input network operation and the output network operation to create a set log files involved with the processing of a network operation that has failed to validate.

For example, referring to FIG. 1, a log file generated in response to the second software application's 104*b* processing of the second network operation 102*b* may have failed to validate. In response to detecting the failure to validate the generated log file, process 400 may access a database storing log files to determine a log file that indicates the second network operation 102*b* being the output of another software application (e.g., software application 104*a*). Upon determining a log file that indicates the second network operation 102*b* as being the output of the other software application (e.g., software application 104*a*), process 400 may extract a network operation identifier (e.g., first network operation 102*a*) that was the input network operation to the other software application (e.g., software application 104*a*). Process 400 can store such log files as a set of log files to generate a chain of log files that are related to the validation failure. Such process may repeat iteratively until process 400 fails to determine a log file that does not indicate an output network operation identifier (e.g., thereby indicating that the current log file is the first log file generated for a given network operation, thereby indicating the original network operation that is associated with the log message that failed to validate). In this example, first network operation 102*a* is the originating network operation that has resulted in a downstream failure to validate. In this way, the system may generate a set of historical log files that are related to the log message that failed to validate, thereby determining an original network operation that has failed to validate at later systems/software applications.

Using the set of historical messages (e.g., historical log files), process 400 can further identify a set of timestamps associated with each historical message of the set of historical messages. For example, process 400 may extract from each message (e.g., log file) a timestamp indicating when a respective log file was generated. Process 400 can then determine, by using the set of timestamps, a first historical message that is associated with a first timestamp that is earlier than other historical messages of the set of historical messages. For instance, process 400 may compare each timestamp of the set of historical messages to each other to determine the log message that was generated first. Process 400 can then extract from the earliest-generated message, an identifier associated with the originating (e.g., input) network operation. For example, the originating network operation may be the original capital market trade order before being processed by any of the systems within the conglomerate-application-based ecosystem. Process 400 may then generate for display at a graphical user interface (GUI), a message indicating (i) the identifier associated with the originating network operation and (ii) an indication that the originating network operation has resulted in a failure to validate. For example, the message that is generated for display at the graphical user interface may be a graphical notification that indicates that the original capital market trade has failed to be processed (or be validated).

In some implementations, process 400 can generate a response to a user-provided query. For example, although process 400 can detect network operations, or alternatively, messages (e.g., log files), failure to validate in real time, users such as data scientists, may want to analyze one or more aspects of the conglomerate-application-based ecosystem. Due to the difficulty in analyzing complex log files, regulations associated with capital market trades, validation processes, or other information, users may want to know specific answers to specific questions regarding the lifecycle of one or more network operations or trades that have occurred via the conglomerate-application-based ecosystem.

Figure 5:
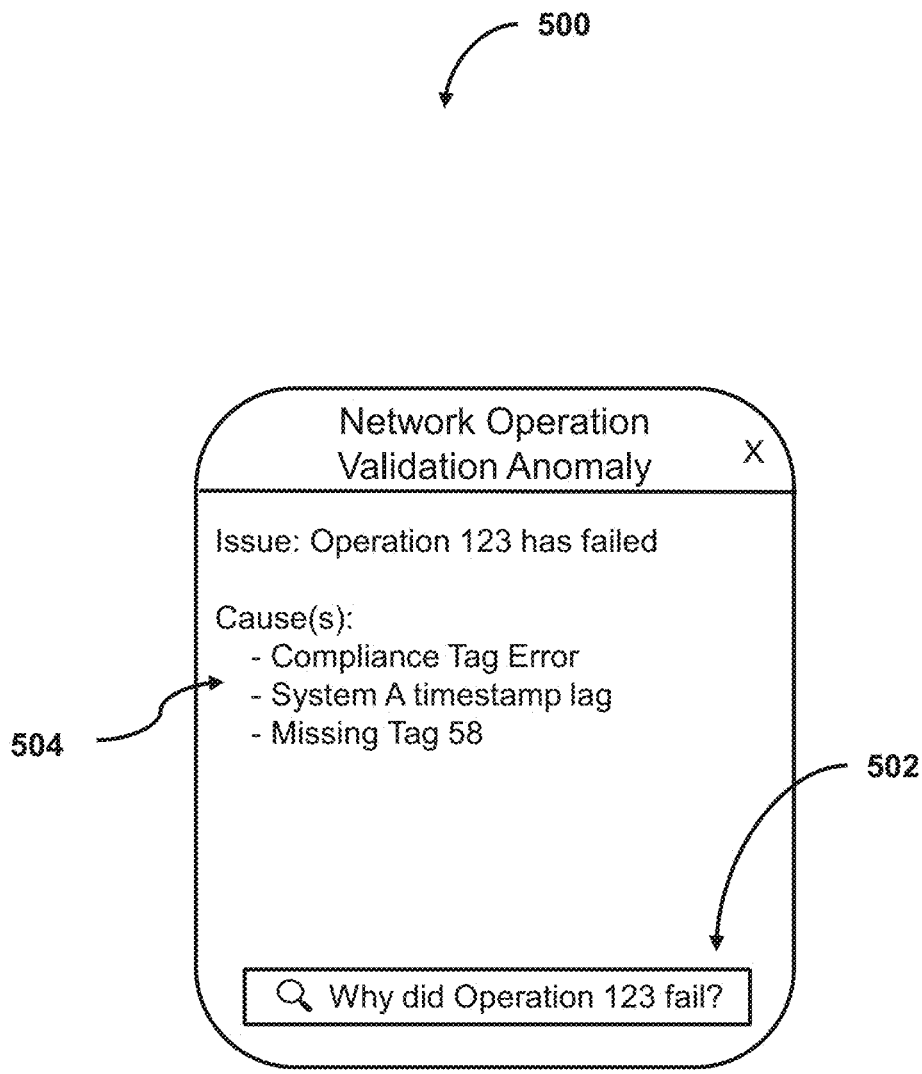
FIG. 5 shows an illustrative representation of a Graphical User Interface (GUI) for detecting network operation validation anomalies in conglomerate-application-based ecosystems, in accordance with some implementations of the present technology.

In particular, when diagnosing one or more network operation validation anomalies, failures, or other errors within the conglomerate-application-based ecosystem, a Large Language Model (LLM) may be particularly useful. For example, process 400 can receive, via a graphical user interface (GUI), a user-provided query, where the user-provided query indicates a request for message-related information (e.g., log message related information) that is associated with a processing of network operations. Referring to FIG. 5, a user interface 500 is provided. Process 400 may receive the user-provided query 502 which may indicate a question (e.g., "Why did Operation 123 fail"). As the log-files store characteristics regarding reasons for why a given network operation or log file has failed to validate (e.g., missing FIX tags, values, or other information), process 400 may provide the user-provided query to a LLM.

The LLM may be trained on (i) a set of validation processes (e.g., validation process rules) associated with validating network operations and (ii) a set of messages (e.g., log files) associated with a processing of network operations. The LLM may learn patterns, relationships, and statistical representations between the validation process rules and the set of messages (e.g., log files, historical log files, etc.) to provide responses to the user-provided queries. For instance, a given validation process may fail to validate a log file is a tag is missing. When the LLM is provided a user-provided query that is asking about a specific network operation, the LLM can generate a response to the user-provided query. For example, referring to FIG. 5, Operation 123 may have been missing a tag as indicated by a log file associated with the processing of operation 123. As such, the LLM may determine such missing tag (e.g., Missing Tag 58) based on the LLM's training and generate a response 504 to the user provided query indicating a message characteristic (e.g., of a log file) that corresponds to the user-provided query that is associated with the set of validation rules. For example, response 504 may include causes as to why a given operation has failed to validate.

In other implementations, however, the LLM is not limited to merely providing causes as to why a given network operation has failed to validate, but can also include providing requirements for given compliance standards, retrieve tag values that are associated with compliance standards, whether any software applications in the conglomerate-based-ecosystem is experiencing an error (or errors), or other information, in accordance with one or more implementations of the present technology.

Figure 6:
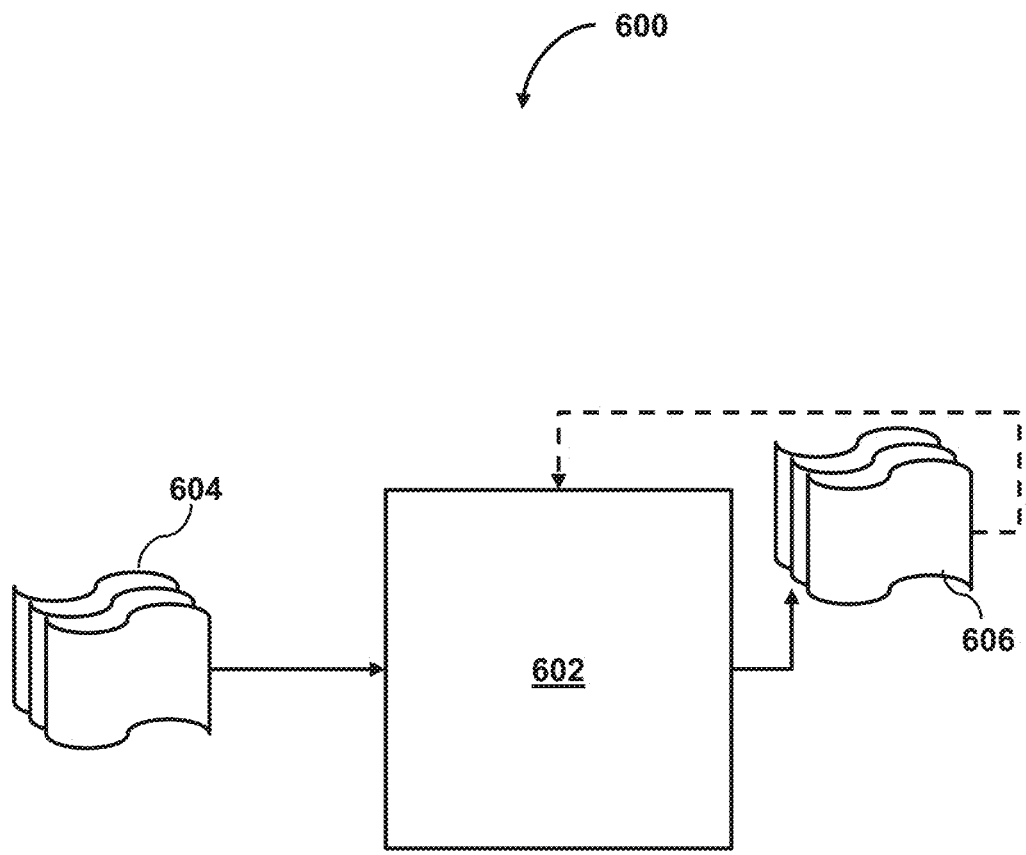
FIG. 6 shows a diagram of an artificial intelligence model for use in providing responses, in accordance with some implementations of the present technology.

Referring to FIG. 6, an artificial intelligence model is shown (e.g., model 602 which may be a machine learning model, artificial intelligence model, etc. (which may be referred collectively as "models" herein). Model 602 may take inputs 604 and provide outputs 606. The inputs may include multiple datasets, such as a training dataset and a test dataset. Each of the plurality of datasets (e.g., inputs 604) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a response to a user-provided query)

In a variety of embodiments, model 602 may update its configurations (e.g., weights, biases, or other parameters) based on the assessment of its prediction (e.g., outputs 606) and reference feedback information (e.g., user indication of accuracy, reference labels, or other information). In a variety of embodiments, where model 602 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation and inhibition for model 602 may be more free-flowing, with connections interacting in a more chaotic and complex fashion. During testing, an output layer of model 602 may indicate whether or not a given input corresponds to a classification of model 602 (e.g., a response to a user provided query).

In some embodiments, the model (e.g., model 602) may automatically perform actions based on outputs 606. In some embodiments, the model (e.g., model 602) may not perform any actions. The output of the model (e.g., model 602) may be used to indicate to a user information pertaining to a network operation validation anomaly.

In some embodiments, the model (e.g., model 602) may be an LLM model. For example, the LLM model may receive a large corpus of text (e.g., a set of validation processes (e.g., validation process rules) associated with validating network operations, a set of messages (e.g., log files) associated with a processing of network operations, user provided queries, or other information) as inputs 604 to generate an output 606. Output 606 may be a response to a user provided query. The LLM model (e.g., model 602) may learn patterns, relationships, and statistical representations between the validation process rules and the set of messages (e.g., log files, historical log files, etc.) to provide responses to the user-provided queries. In some implementations, the responses to the user-provided queries (e.g., outputs 606) may be fed back into the LLM model as reference feedback information to further train model 602.

Dynamic Anomaly Evaluation and Correction

The systems and methods disclosed herein include an anomaly evaluation platform that dynamically monitors the associated system for anomalies. For example, the anomaly evaluation platform evaluates messages or network operations generated by software applications of the system based on a validation model (e.g., a machine learning model) that accounts for previous communications between system components (e.g., software applications) and/or a dynamically monitored system state (e.g., describing a state of computational resource usage). By doing so, the anomaly evaluation platform enables validation and/or correction of network operations (and/or associated software applications) in a dynamic, adaptable manner.

Figure 7:
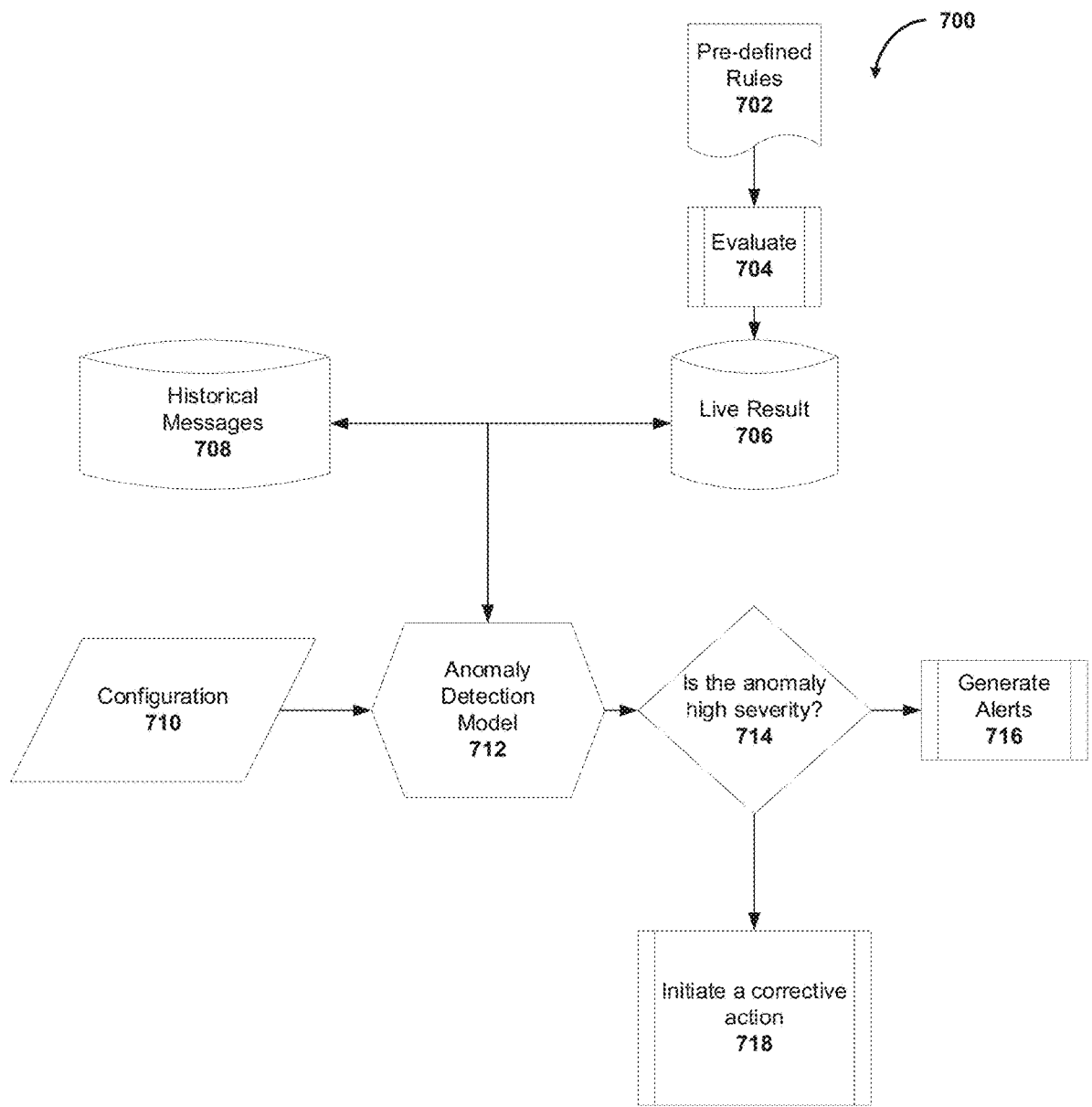
FIG. 7 shows a diagram of a flow for detecting and mitigating network operation validation anomalies, in accordance with some implementations of the present technology.

FIG. 7 shows a diagram of a flow 700 for detecting and mitigating network operation validation anomalies, in accordance with some implementations of the present technology. For example, the anomaly evaluation platform enables automated detection of network operations (e.g., associated with conglomerate-application-based ecosystems) for dynamic, real-time evaluation and mitigation of anomalies, errors, or other discrepancies. To illustrate, the anomaly evaluation platform can receive an indication of a network operation for evaluation against pre-defined rules (e.g., pre-defined rules 702 of FIG. 7) at operation 704.

FIG. 8 shows a schematic of a data structure 800 representing a network operation, in accordance with some implementations of the present technology. As described above in relation to FIG. 1, network operations can include data associated with one or more software applications. A network operation can include values 804 associated with corresponding fields 802.

For example, a particular data entry 806 within the network operation can include a field and corresponding value for an account (e.g., a bank account number or another suitable identifier), a "begin string" (e.g., indicating an alphanumerical string of characters corresponding to the start of the network operation according to a suitable protocol), a body length (e.g., indicating a number of characters associated with the network operation), a checksum (e.g., for validation purposes), a cumulative quantity (e.g., associated with a quantity of traded assets), a currency (e.g., associated with a monetary instrument), a previous price (e.g., associated with a previous "parent" network operation), a previous quantity (e.g., associated with the previous network operation), a current price, and/or an associated timestamp. By evaluating such information associated with network operations (e.g., within a conglomerate-application-based ecosystem), the anomaly evaluation platform can detect any anomalies prior to transmission or re-routing to the next intended software application (e.g., in a chain-based architecture), thereby preventing the propagation of anomalies across various ecosystem components.

The anomaly evaluation platform can evaluate detected network operations according to pre-defined or dynamically changing rules or processes (e.g., as described in relation to FIG. 4). A validation rule can include an indication of a condition and/or an outcome associated with the condition. For example, a validation rule includes a process that determines whether a particular network operation includes any associated compliance information, mandatory values or tags, and/or valid values for such tags. In some implementations, a validation rule is associated with or depends on other components (e.g., other software applications or network operations) within the ecosystem. A validation rule can include a validation process executed if the network operation is associated with another particular software application (e.g., identified by an identifier of the software application). As relationships between network operations and associated rules can be complex, the anomaly evaluation platform can generate a communication map that represents such relationships (e.g., linked rules) in a dynamic manner to prevent obsolescence of rules and the relationships thereof.

The anomaly evaluation platform can determine, generate, and/or extract validation rules using one or more machine learning models. For example, the anomaly evaluation platform receives, retrieves, or otherwise obtains information (e.g., relating to regulations, updated policies, or textual data). Based on the obtained information, the anomaly evaluation platform can generate validation rules. For example, the anomaly evaluation platform generates one or more validation rules (e.g., linked together) based on extracting rules from a regulation dataset and generating corresponding criteria or rules (e.g., within the communication map).

Figure 9:
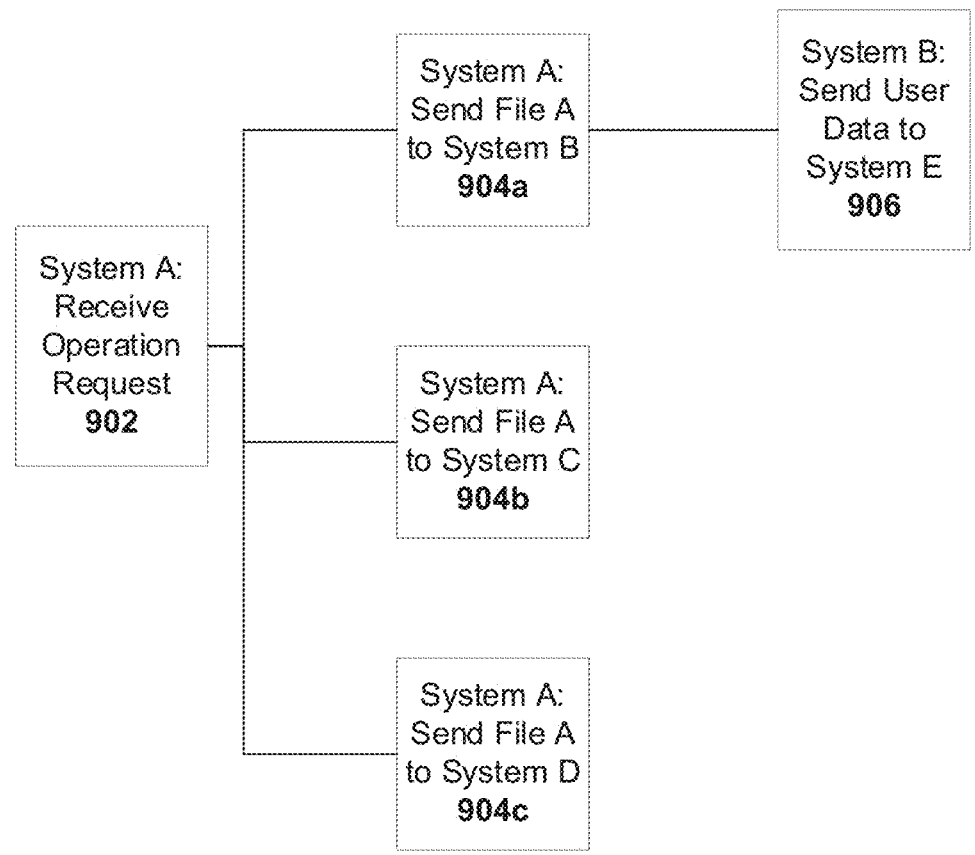
FIG. 9 shows a schematic of a communication map indicating relationships between validation rules, in accordance with some implementations of the present technology.

FIG. 9 shows a schematic of a communication map 900 indicating relationships between validation rules, in accordance with some implementations of the present technology. A communication map can include a representation of components of the ecosystem (e.g., software applications, associated nodes, associated network operations, and/or associated validation rules). For example, a communication map includes information relating to the nature of validation rules associated with a particular software application of the conglomerate-application-based ecosystem, as well as relationships between the rules. For example, the communication map 900 includes a validation rule 902 that is a parent to validation rules 904a, 904b, and 904c. In turn, the validation rule 904a is shown to be a parent to validation rule 906. Equivalently, the communication map 900 shows that the validation rule 906 is a child to the validation rule 904a, which, in turn, is a child to the validation rule 902. In some implementations, the anomaly evaluation platform can validate fields associated with network operations (e.g., tags for messages), where such fields may be linked to fields associated with other child rules and/or systems. For example, the anomaly evaluation platform ensures that values for fields associated with the child rules are consistent with the corresponding values for fields associated with the parent rules. By plotting relationships between validation rules in such a manner, the anomaly evaluation platform enables tracking, monitoring, and specification of validation rules in a dynamic manner, thereby improving the accuracy and customizability of the platform's network operation validation.

In some implementations, the communication map can include a tabular structure or another suitable data structure. Additionally or alternatively, the communication map includes a graphical representation of relationships or links between validation rules. For example, the anomaly evaluation platform generates the communication map for display on a user interface (e.g., associated with an administrator or quality control system). The graphical representation of the communication map can include graphical indications of validation rules (e.g., including a token, spirit, or description of a particular validation rule and its relationship with other validation rules and/or system components). For example, a graphical indication of a validation rule can include an indication of the nature of the validation rule, as well as the system (e.g., node and/or software application) to which the validation rule applies. In some implementations, a user (e.g., an administrator) can interact with the graphical representation of the communication map. In some implementations, the anomaly evaluation platform generates a flowchart (or other similar representation) that shows nodes (e.g., rules) of the communication map for display on the GUI. Responsive to detecting a user interaction (e.g., "left click") with one or more of the nodes of the communication map, the anomaly evaluation platform can generate details associated with validation rules (e.g., including fields and associated validation criteria). The anomaly validation platform receives a request to modify (e.g., disable or change the conditions of) a selected validation rule (e.g., based on an indication that a user has interacted with an associated user control associated with the GUI). Based on the rule modification indication, the anomaly evaluation platform can modify the rule associated with the communication map accordingly, enabling dynamic, intuitive control of validation rules and conditions within the conglomerate-application-based ecosystem.

As shown in FIG. 7, the anomaly evaluation platform can generate a live result 706 indicating a preliminary or "running" validation status for the validity of a given network operation. To illustrate, the anomaly evaluation platform can provide the detected network operation, as well as a previous network operation (e.g., which was provided as input to the software application in order to generate the detected network operation) to a validation model (e.g., the anomaly detection model 712). A validation model can include a generative artificial intelligence (AI) model or any other suitable computer model that enable validation (e.g., evaluation) of network operations. For example, a validation model receives one or more network operations as inputs; based on the one or more network operations, the validation model can generate a validation status that indicates whether the network operations are valid (e.g., associated with high risk). For example, the validation model can leverage information from a network operation database (e.g., historical messages 708 shown in FIG. 7) to improve the characterization and evaluation of network operations.

In some implementations, the validation model includes one or more machine learning models as described in relation to FIG. 6. For example, the validation model includes one or more LLMs or other suitable natural language generation models. The LLM can include one or more transformer-based neural networks that are capable of evaluating network operations (e.g., along with prompts). In some implementations, the validation model accesses the network operation database (e.g., historical messages 708) to enable analysis of stored data, associated log messages, and/or identifies linkages between such operations (e.g., based on being provided with the communication map).

The validation model outputs a validation status and/or associated information. For example, the validation status includes an indication of whether the network operation is valid. In some implementations, the validation model generates anomaly indicators including anomaly types and corresponding classification indicators. The anomaly evaluation platform can determine the validation status based on such anomaly indicators.

FIG. 10 shows a schematic 1000 of anomaly indicators including anomaly types and corresponding priority classification indicators, in accordance with some implementations of the present technology. For example, the validation model generates a schematic 1000 that contains anomaly indicators 1006, including anomaly types 1002 and associated priority classification indicators 1004. An anomaly type can include a description or indication of a detected anomaly. For example, an anomaly type includes an indication of a new tag found in a network operation (e.g., a tag previously not seen within the network operation database and/or a tag that is unexpected for the given network operation and/or software application). The anomaly type can include an indication of a length of a tag and/or associated value above a particular threshold value. The anomaly type can include an indication of a new value observed (e.g., a market, a country and/or customer slang). For example, the anomaly type includes a charged commission above an allowed threshold value.

In some implementations, the validation model characterizes each detected anomaly (e.g., corresponding to an anomaly indicator) based on the severity, risk level, or another characterizing property of the anomaly. For example, the validation model generates a priority classification indicator associated with the associated anomaly. The classification indicator can represent a predicted level of risk or priority associated with the anomaly (e.g., "high," "medium," or "low") and/or a quantitative value associated with the anomaly (e.g., within a range from 0 to 100, 0 to 10, 1 to 5, or another suitable range). In some implementations, the validation model accounts for the type of network operation, an account type associated with the network operation, and/or a system state (as discussed below) to determine the classification indicators. For example, the anomaly evaluation platform determines to prioritize errors (e.g., by assigning a "high" or "medium" classification) associated with new countries for transactions that are associated with or are between domestic entities, while de-prioritizing anomalies associated with new tags. Additionally or alternatively, the anomaly evaluation platform can determine to de-prioritize errors associated with new countries (e.g., by assigning a "low" priority classification accordingly) for international transactions. As such, the anomaly evaluation platform can assign priority in a dynamic, customized, context-sensitive manner, thereby improving the efficiency and accuracy of the ecosystem. In some implementations, the anomaly evaluation platform can customize the behavior of the validation model using the configuration 710, as shown in FIG. 7 (e.g., by modifying and/or storing validation rules and associated conditions within the configuration 710).

In some implementations, the validation model is trained using training data that includes information within the network operation database (e.g., historical messages 708). The training data can include indications of previous network operations associated with the ecosystem and/or associated computational resource metric values. For example, the anomaly evaluation platform provides previous network operations (e.g., previous messages and/or transaction information) to the validation model for training (e.g., tuning) model parameters associated with the validation model. The anomaly evaluation platform provides an indication of a detected anomaly, the system state (e.g., an indication of computational resource metric values at the time of the associated network operation), and/or other information associated with the anomaly (e.g., an associated mitigation effort or procedure) to the validation model to train the validation model to handle similar anomalies in the future. By doing so, the anomaly evaluation platform enables dynamic, real-time, continual learning of the validation model to handle new validation errors or anomalies that are previously unencountered.

The anomaly evaluation platform can determine a system state associated with the ecosystem. A system state can include an indication of one or more computational resource metric values. A computational resource metric value can include a characterization or indication associated with a computational resource (e.g., a performance value). For example, a computational resource metric can include memory usage, central processing unit (CPU) processing power (e.g., a clock speed or available cores/threads), a graphics processing unit (GPU) power (e.g., a clock speed or available cores/threads), network bandwidth (e.g., a latency or response time), or other such resources. In some implementations, the computational resource metric value can be specific to one or more particular nodes or components of the ecosystem; additionally or alternatively, the computational resource metric value is comprehensive (e.g., characterizes the ecosystem as a whole). By retrieving and incorporating a system state associated with the ecosystem, the anomaly evaluation platform can evaluate or predict the effect of anomalies on the system performance (e.g., for relevant nodes). Moreover, the anomaly evaluation platform can leverage knowledge of the system state to redirect or reroute network operations to conserve system resources and improve system efficiency. As such, the anomaly evaluation platform enables dynamic, adaptable control over system performance and anomaly mitigation.

To illustrate, the anomaly evaluation platform enables dynamic and predictive resource allocation (e.g., based on scaling and optimization). For example, the anomaly evaluation platform can train a resource usage prediction model based on pre-processed datasets including historical resource usage (e.g., associated with the network operation database). The historical resource usage data can include CPU metric values, memory metric values or other computational resource metric values (e.g., associated with historical network operations). The resource usage prediction model can determine patterns, trends, and cyclical behavior associated with the historical resource usage data in order to predict future resource usage and/or suggest consistent resource allocations. As such, the anomaly evaluation platform enables scaling up of resources in anticipation of high demand for computational resources. Moreover, the anomaly evaluation platform enables improvements to resource usage efficiency (e.g., by scaling down, de-allocating or de-activating resources during predicted low-usage intervals).

Based on the validation status, the anomaly evaluation platform can determine whether to execute a corrective action or generate alerts (e.g., at operation 714 shown in FIG. 7). For example, the anomaly evaluation platform determines that the set of detected anomalies includes at least one anomaly type that is associated with a "high" priority level. Based on such a determination, the anomaly evaluation platform determines to execute a corrective action. Additionally or alternatively, the anomaly evaluation platform determines an average severity level associated with the network operation based on the validation status (e.g., an average severity metric). Based on the average severity level (e.g., based on comparing the average severity level with a threshold value), the anomaly evaluation platform can determine whether to execute a corrective action (e.g., at operation 718), generate alerts (e.g., at operation 716), and/or allow transmission of the network operation to its intended destination or target node. As such, the anomaly evaluation platform enables flexible handling and treatment of network operations based on the nature of (e.g., severity or risk level associated with) the detected anomalies.

In some implementations, the anomaly evaluation platform determines a node to which to transmit a validated network operation based on the system state (e.g., using a routing model). A routing model can include a machine learning model (e.g., an LLM, a classification machine learning model, a decision tree, or another suitable machine learning model). For example, a routing model accepts network operations (e.g., a network operation input into or output from a software application), information relating to the system state (e.g., system performance), and/or the associated communication map (e.g., updated to include information relating to the latest validation rules and/or system architecture). Based on such data, the routing model can provide a prediction for a particular node or software application that is suitable for processing the output network operation. For example, the anomaly evaluation platform can, using the routing model, determine to transmit the network operation to a node with sufficient available memory (e.g., according to the determined system state), thereby improving the efficiency of the conglomerate-application-based ecosystem.

In some implementations, the anomaly evaluation platform executes a corrective action. A corrective action includes an action for the mitigation, prevention, and/or correction of one or more anomalies associated with a particular network operation. For example, the anomaly evaluation platform enables determination of and execution of a mitigation protocol in response to detected anomalies. The anomaly evaluation platform can generate an indication of a corrective action by providing the network operation and/or validation status to a corrective action model. Additionally or alternatively, the anomaly evaluation platform can retrieve (e.g., from the network operation database) information relating to a corrective action to cure one or more anomalies detected by the validation model. For example, the anomaly evaluation platform can retrieve a corrected set of values (and/or a procedure for generating corrected values) and modify values associated with corresponding fields of the network operation to cure the anomaly. In some implementations, modifying a value includes initiating a trade correction (e.g., associated with a capital market trade) to update a field associated with a commission value to a default value. Additionally or alternatively, modifying a value includes initiating a trade correction and updating a field associated with a foreign exchange rate to include a value from a dynamically monitored live foreign exchange system. The corrective action can include determining a root cause associated with a given error (e.g., based on information or previous issues detected and stored in the network operation database). The corrective action can include transmitting an alert that includes information relating to this root cause (e.g., a description or identifier of the cause). In some implementations, the alert includes information relating to remediation steps (e.g., computer operations associated with remediation) that are likely to resolve the detected error (e.g., based on information relating to previously executed remediation steps stored in the network operation database).

Additionally or alternatively, the anomaly evaluation platform can generate an indication of a corrective action using a corrective action model. The corrective action model can accept one or more anomaly indicators (e.g., the validation status), as well as the network operations, as input; in response, the corrective action model can generate an indication of a recommended corrective action for curing the generated anomalies. A corrective action can include initiation of pre-defined and/or dynamically updated mitigation protocols. In some implementations, the anomaly evaluation platform can assign default values in situations where particular identifiers (associated with tags or fields) are missing. As an illustrative example, the corrective action model is an LLM (e.g., trained on corrective actions previously executed within the ecosystem). For example, the corrective action model can be trained on and/or accept, within a prompt, data associated with previous or historical corrective actions (e.g., taken manually and/or autonomously) in response to historical validation errors.

For example, the anomaly evaluation platform trains the corrective action model based on historical data that includes previous messages (e.g., including information characterizing trades, modifications of such trades, and/or cancellations of such trades). In some implementations, the anomaly detection platform validates rules to generate relationships between such rules (e.g., a communication map). The anomaly detection platform can store the messages as rules at a field-level and/or tag-level, as well as store information relating to relationships or linkages between such tags. The anomaly detection platform can retrieve information relating to a domain (e.g., information, requirements, or expected behavior associated with the particular system and/or network operations) and characterize or define the scope, severity, and/or definitions of anomalies (e.g., in a modifiable configuration file). Based on such information, the anomaly detection platform can evaluate the severity of detected anomalies and assess the severity of such anomalies based on these rules. In some implementations, training the corrective action model may occur in real-time and/or dynamically. As such, the anomaly evaluation platform enables dynamic mitigation of anomalies (e.g., errors) based on retrieval of mitigation protocols.

In some implementations, the anomaly evaluation platform can generate one or more alerts (e.g., at operation 716 of FIG. 7). An alert can include an indication of a detected anomaly (e.g., for transmission to and/or display on an administrator device or another suitable destination). For example, the alert includes relevant log files or contextual information (e.g., the system state). In some implementations, the alert can include an indication of a possible corrective action (e.g., as generated from a corrective action model).

Figure 11:
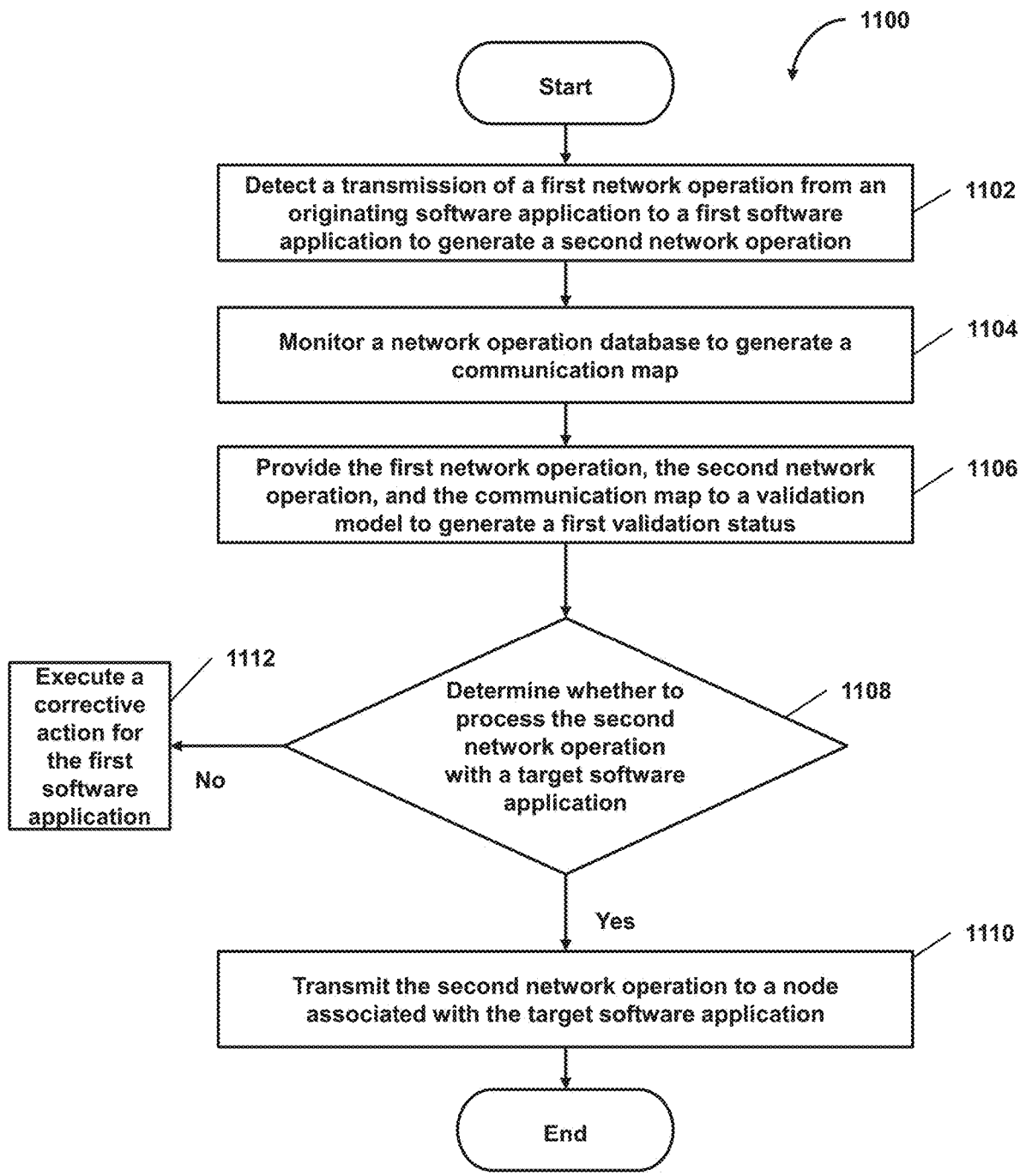
FIG. 11 is a flow diagram illustrating a process of dynamically evaluating and mitigating network operation validation anomalies, in accordance with some implementations of the present technology.

FIG. 11 is a flow diagram illustrating a process of dynamically evaluating and mitigating network operation validation anomalies, in accordance with some implementations of the present technology.

At act 1102, process 1100 can detect the transmission of a first network operation from an originating software application to a first software application to generate a second network operation. For example, the anomaly evaluation platform detects a transmission of a first network operation from an originating software application to a first software application of a set of software applications, where (i) the first network operation is configured to receive an input network operation, (ii) the first network operation is configured to be provided as input to the first software application and (ii) the first software application generates a second network operation as output, using the first network operation. As an illustrative example, the anomaly evaluation platform detects that a software application (e.g., associated with a microservice involved in processing a transaction within a capital market trade pipeline) has generated the second network operation (e.g., a message characterizing the corresponding trade) in response to an associated request (e.g., characterized by the first network operation). As a result of processing the first network operation, the system can generate the second network operation, which can be configured to be provided as input to a third target software application. As an example, the second software application can be another software application that is a part of the conglomerate-application-based ecosystem (e.g., associated with a node of the ecosystem 300). In the context of capital market systems, the second software application may be a microservice software application that is configured to accept the second network operation as input.

At act 1104, process 1100 can monitor a network operation database to generate a communication map. For example, the anomaly evaluation platform monitors a network operation database to generate a communication map comprising an indication of parent-child relationships between validation rules associated with software applications of the set of software applications. As an illustrative example, the anomaly evaluation platform determines relationships between components of the ecosystem (e.g., associated software applications or the corresponding devices or nodes) based on a database of network operations associated with the system. The database of network operations can include current and/or historical network operations associated with the ecosystem, such as those associated with previous trades or messages processed by other software applications within the system. In some implementations, the database of network operations indicates relationships between such messages or network operations (e.g., parent-child relationships between such network operations). Additionally or alternatively, the database of network operations indicates relationships between software applications or nodes of the ecosystem between which network operations are transmitted. As an illustrative example, the anomaly evaluation platform can determine relationships between rules, where such rules can be associated with one or more software applications or nodes of the ecosystem. For example, rules can include parent-child relationships (e.g., whereby a first rule derives from one or more other rules). By identifying and mapping relationships between the ecosystem's components, the anomaly evaluation platform can generate a comprehensive map of relevant system components to improve the efficiency, relevance, and accuracy of anomaly detection and evaluation.

In some implementations, the anomaly evaluation platform generates the communication map on a GUI that is accessible to a relevant user (e.g., an administrator system or device). For example, the anomaly evaluation platform generates, on a user interface associated with a user device, a graphical representation of the communication map. The graphical representation can include graphical indications of the validation rules associated with the software applications of the set of software applications. As an illustrative example, the anomaly evaluation platform can generate a graphical representation of components of the ecosystem and/or associated validation rules (e.g., as shown in FIG.

10). The anomaly evaluation platform can cause the generation of textboxes and/or other suitable user controls or graphical features for display within a user device (e.g., of an administrator or administrator system), where each textbook or user control represents a validation rule (e.g., associated with validating values for tags/fields of network operations generated by software applications). The GUI can illustrate relationships between components (e.g., validation rules, software applications, and/or associated nodes) of the communication map using an indication (e.g., a connecting line, arrow, or another suitable indication of a relationship). Such relationships can include parent-child, sibling, and/or other suitable relationships. In some implementations, the communication map (e.g., as generated on the GUI) indicates relationships between the software applications or network operations themselves. By enabling the user to visualize the communication map and/or associated validation rules, the anomaly evaluation platform enables improved identification of and manual review of anomalies associated with the ecosystem.

In some implementations, the anomaly evaluation platform enables user interaction with the communication map (e.g., for viewing, inspection, and/or modification of the components or connections of the communication map). For example, the anomaly evaluation platform receives, from the user interface associated with the user device, a rule modification request comprising (i) a selection of a graphical indication of a first validation rule of the graphical representation of the communication map and (ii) an indication of a rule modification. In response to receiving the rule modification request, the anomaly evaluation platform can modify the first validation rule of the network operation database according to the rule modification. As an illustrative example, the anomaly evaluation platform enables a user (e.g., an administrator associated with an administrator system) to modify one or more validation rules and/or associated connections (e.g., parent-child relationships) using user controls associated with the GUI display of the communication map. To illustrate, the anomaly evaluation platform can receive a request (e.g., a user interaction with the GUI) to modify one or more validation rules and/or a parent-child relationship between such validation rules (e.g., by receiving an indication of a drag-and-drop operation for a connection between two validation rules of the communication map). Based on this modification request, the anomaly evaluation platform can cause modification of validation rules according to the requested modification, thereby enabling interactive, dynamic control of validation rules associated with the conglomerate-application-based ecosystem.

At act 1106, process 1100 can provide the first network operation, the second network operation, and the communication map to a validation model to generate a first validation status. For example, the anomaly evaluation platform provides the first network operation, the second network operation, and the communication map to a validation model to generate a first validation status indicating whether the second network operation is valid based on the validation rules. As an illustrative example, the anomaly evaluation platform can provide information relating to the detected network operation (e.g., a detected message relating to a trade associated with a capital market trading platform) to the validation model to enable detection of any associated anomalies or errors within the generated network operation. For example, the anomaly evaluation platform can provide the first network operation (e.g., a message input into the first software application), as well as the resulting, generated network operation (e.g., a message generated by the first software application in response to the input) to the validation model to evaluate for the presence of any errors or anomalies within the message. In some implementations, the anomaly evaluation platform provides the communication map as an input for the validation model to improve the accuracy of anomaly detection by the validation model (e.g., by leveraging the information associated with connections between validation rules provided by the communication map). As such, the anomaly evaluation platform can determine a validation status for the detected network operation (e.g., indicating any detected errors or anomalies that are inconsistent with the validation rules of the communication map). By doing so, the anomaly evaluation platform enables comprehensive anomaly detection and evaluation based on contextual information associated with the system (e.g., the conglomerate-application-based ecosystem).

In some implementations, the anomaly evaluation platform generates anomaly indicators using the validation model for determination of the validation status. For example, the anomaly evaluation platform provides the first network operation, the second network operation, and the communication map to the validation model to generate one or more anomaly indicators based on the validation rules. Each anomaly indicator of the one or more anomaly indicators can include an indication of an anomaly type and a corresponding priority classification indicator. The anomaly evaluation platform can generate the first validation status based on the one or more anomaly indicators. In response to generating the first validation status based on the one or more anomaly indicators, the anomaly evaluation platform can determine whether to process the second network operation with the target software application. As an illustrative example, the validation model can output information characterizing anomalies, errors, or other discrepancies (e.g., including a severity level and/or an indication of a reason for the validation failure). To illustrate, the validation model can determine whether a particular value associated with a tag within a network operation is erroneous or inconsistent, as well as determine a severity or risk level for the error. In some implementations, the validation model determines a severity level for a given anomaly based on information associated with system performance and/or an associated application or use-case. By doing so, the anomaly evaluation platform can dynamically detect and characterize anomalies in a manner that informs further processing (e.g., further mitigation or correction).

In some implementations, the anomaly evaluation platform trains the validation model using information relating to previous network operations and associated system states (e.g., computational resource metric values). For example, the anomaly evaluation platform obtains, from the network operation database, training data comprising (i) indications of previous network operations and (ii) indications of associated computational resource metric values measuring system performance associated with the previous network operations. The anomaly evaluation platform can provide the training data to the validation model to train the validation model to generate validation statuses for network operations based on communication maps. In some implementations, the training data includes the first and/or second network operations and the first validation status. As an illustrative example, the anomaly evaluation platform can feed information relating to any dynamically detected anomalies (e.g., including concurrent system performance) to the validation model to improve its predictions (e.g., of severity or risk levels and/or of suggested corrected actions).

By doing so, the anomaly evaluation platform enables dynamic, continual learning to improve anomaly detection, evaluation, characterization, and mitigation.

At act 1108, process 1100 can determine whether to process the second network operation with the target software application. For example, based on the first validation status, the anomaly evaluation platform determines whether to process the second network operation with a target software application. As an illustrative example, the anomaly evaluation platform determines whether one or more anomaly indicators associated with the validation status indicate a "high" or "medium" risk level. Based on such a determination, the anomaly evaluation platform can determine whether to transmit the generated second network operation to the intended destination (e.g., a node associated with the third software application) and/or whether to execute mitigative or corrective action to mend the anomaly. By doing so, the anomaly evaluation platform acts as a real-time protective barrier to prevent malfunctions, breaches, or unintended behavior (e.g., within the conglomerate-application-based ecosystem).

At act 1110, process 1100 can transmit the second network operation to a node associated with the target software application. For example, in response to determining to process the second network operation with the target software application, the anomaly evaluation platform transmits the second network operation to a node associated with the target software application. As an illustrative example, In some implementations, the anomaly evaluation platform determines the target software application based on information relating to the state of computational resource usage within the system. For example, the anomaly evaluation platform determines a system state comprising one or more predicted computational resource metric values for a set of nodes. The anomaly evaluation platform can provide the second network operation, the system state, and the communication map to a routing model to determine the target software application. In response to determining the target software application, the anomaly evaluation platform can transmit the second network operation to the node of the set of nodes. As an illustrative example, the anomaly evaluation platform can determine a node to which to transmit the second network operation based on information relating to the system performance (e.g., across the conglomerate-application-based ecosystem). To illustrate, the anomaly evaluation platform can determine memory usage associated with individual nodes within the ecosystem and transmit the second network operation to a node with sufficient available memory for processing with the third (e.g., target) software application. By doing so, the anomaly evaluation platform can improve system performance by avoiding transmission of the network operation to a node with insufficient resources for processing (e.g., storing or executing) the network operation.

At act 1112, process 1100 can execute a corrective action for the first software application. For example, in response to determining not to process the second network operation with target software application and in lieu of transmitting the second network operation to the node, the anomaly evaluation platform executes a corrective action for the first software application. As an illustrative example, the anomaly evaluation platform determines (e.g., based on an output of the validation model) a protocol, algorithm, or procedure to perform to mitigate the effects of and/or cure one or more detected anomalies. A corrective action can include an action to correct one or more values associated with one or more fields (e.g., tags) of the network operation.

In some implementations, a corrective action includes generating, retrieving, and/or executing a patch to an associated software application of the ecosystem. As such, the anomaly evaluation platform enables prompt, adaptable, and dynamic curing of anomalies or other discrepancies associated with the conglomerate-application-based ecosystem based on dynamic validation of network operations within the ecosystem.

In some implementations, the anomaly evaluation platform determines a suitable corrective action for the one or more detected anomalies using the validation model. For example, the anomaly evaluation platform provides the first network operation, the second network operation, and the one or more anomaly indicators to a corrective action model to generate an indication of the corrective action in lieu of transmitting the second network operation to the node. In response to generating the indication of the corrective action, the anomaly evaluation platform can execute the corrective action. As an illustrative example, the anomaly evaluation platform can generate an indication of a corrective action by providing suitable network operations (e.g., the values associated with fields within the network operations), as well as results of the validation model (e.g., including indications of the detected anomalies) to a corrective action model to determine a suitable corrective action. In some implementations, the anomaly evaluation platform can train the corrective action model dynamically (e.g., based on newly detected anomalies in other portions of the ecosystem or associated with other software applications). As such, the anomaly evaluation platform can improve the efficiency, adaptability, and flexibility of predictions for mitigation procedures in response to detected anomalies, thereby improving the resilience of the ecosystem in the presence of a changing landscape of vulnerabilities and anomalies.

In some implementations, the anomaly evaluation platform executes the corrective action by modifying one or more values associated with corresponding fields within the input network operation (e.g., the first network operation). For example, the anomaly evaluation platform determines, based on the first validation status, a mitigation protocol indicating a modification to the first network operation. The anomaly evaluation platform can determine a first field associated with the first network operation and a first value associated with the first field. The anomaly evaluation platform can update the first network operation by modifying the first value. The anomaly evaluation platform can provide the updated first network operation to the first software application to cause generation of an updated second network operation as output. The anomaly evaluation platform can transmit the updated second network operation to the node. As an illustrative example, the anomaly evaluation platform can correct values associated with the network operations (e.g., identifiers, alphanumeric characters, and/or other information) based on anomalies identified by the validation model. For example, based on an indication of a "high"-risk anomaly relating to an invalid "Price" value for the network operation, the validation model can correct the "Price" value (e.g., by identifying and fixing a typographical error) and/or by retrieving a correct value from an associated user and/or database. By doing so, the anomaly evaluation platform enables prompt, dynamic, and accurate curing of anomalies or other discrepancies associated with the conglomerate-application-based ecosystem, thereby improving its resilience and efficiency.

In some implementations, the anomaly evaluation platform updates the communication map at another time (e.g., at a time of detection of a third network operation). For example, the anomaly evaluation platform detects a transmission of a third network operation from a second originating software application to the first software application. The first software application can generate a fourth network operation as output, using the third network operation. In response to monitoring the network operation database, the anomaly evaluation platform can generate an updated communication map comprising a second updated indication of parent-child relationships between second validation rules associated with software applications of the set of software applications. The anomaly evaluation platform can provide the third network operation, the fourth network operation, and the updated communication map to the validation model to generate a second validation status indicating whether the fourth network operation is valid. In response to the second validation status indicating that the fourth network operation is not valid, the anomaly evaluation platform can execute a first corrective action associated with the second validation status. As an illustrative example, the anomaly evaluation platform can update the communication map (e.g., including information relating to connections or relationships between validation rules for software applications and associated network operations) in response to detecting a new network operation (e.g., at a second time different from a first time associated with the second network operation). By doing so, the anomaly evaluation platform can dynamically adjust validation and mitigation predictions based on changing system architectures or conditions, thereby improving the resilience and adaptability of the conglomerate-application-based ecosystem.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for detecting and mitigating network operation validation anomalies in conglomerate-application-based ecosystems, the system comprising:
    at least one hardware processor; and
    at least one non-transitory memory storing instructions, which, when executed by the at least one hardware processor, cause the system to:
        detect a transmission of a first network operation from a first originating software application to a first software application of a set of software applications, wherein (i) the first network operation is configured to receive an input network operation, (ii) the first network operation is configured to be provided as input to the first software application, and (iii) the first software application generates a second network operation as output, using the first network operation;

monitor a network operation database to generate a communication map comprising a first indication of parent-child relationships between first validation rules associated with software applications of the set of software applications;

provide the first network operation, the second network operation, and the communication map to a validation model to generate a first validation status indicating whether the second network operation is valid;

based on the first validation status, determine whether to process the second network operation with a first target software application;

in response to determining to process the second network operation with the first target software application, transmit the second network operation to a node associated with the first target software application;

detect a transmission of a third network operation from a second originating software application to the first software application, wherein the first software application generates a fourth network operation as output, using the third network operation;

in response to monitoring the network operation database, generate an updated communication map comprising a second updated indication of parent-child relationships between second validation rules associated with software applications of the set of software applications;

provide the third network operation, the fourth network operation, and the updated communication map to the validation model to generate a second validation status indicating whether the fourth network operation is valid; and in response to the second validation status indicating that the fourth network operation is not valid, execute a first corrective action associated with the second validation status.

2. The system of claim 1, wherein the instructions for transmitting the second network operation to the node associated with the first target software application cause the system to:

determine a system state comprising one or more predicted computational resource metric values for a set of nodes of the system;

provide the second network operation, the system state, and the communication map to a routing model to determine the first target software application; and in response to determining the first target software application, transmit the second network operation to the node of the set of nodes.

3. The system of claim 1, wherein the instructions for determining whether to process the second network operation with the first target software application cause the system to:

provide the first network operation, the second network operation, and the communication map to the validation model to generate one or more anomaly indicators based on the first validation rules, wherein each anomaly indicator of the one or more anomaly indicators includes an indication of an anomaly type and a corresponding priority classification indicator;

generate the first validation status based on the one or more anomaly indicators; and in response to generating the first validation status based on the one or more anomaly indicators, determine whether to process the second network operation with the first target software application.

4. The system of claim 1, wherein the instructions further cause the system to:

obtain, from the network operation database, training data comprising (i) indications of previous network operations and (ii) indications of associated computational resource metric values measuring system performance associated with the previous network operations; and provide the training data to the validation model to train the validation model to generate validation statuses for network operations based on communication maps.

5. The system of claim 4, wherein the instructions for obtaining the training data cause the system to generate the training data including the first network operation, the second network operation, and the first validation status.

6. The system of claim 1, wherein the instructions for generating the communication map cause the system to:

generate, at a user interface associated with a user device, a graphical representation of the communication map, wherein the graphical representation comprises graphical indications of the first validation rules associated with the software applications of the set of software applications.

7. The system of claim 6, wherein the instructions further cause the system to:

receive, from the user interface associated with the user device, a rule modification request comprising (i) a selection of a graphical indication of a first validation rule of the graphical representation of the communication map and (ii) an indication of a rule modification; and in response to receiving the rule modification request, modify the first validation rule of the network operation database according to the rule modification.

8. A method comprising:

detecting a transmission of a first network operation from an originating software application to a first software application of a set of software applications, wherein (i) the first network operation is configured to receive an input network operation, (ii) the first network operation is configured to be provided as input to the first software application, and (iii) the first software application generates a second network operation as output, using the first network operation;

monitoring a network operation database to generate a communication map comprising an indication of parent-child relationships between validation rules associated with software applications of the set of software applications;

providing the first network operation, the second network operation, and the communication map to a validation model to generate a first validation status indicating whether the second network operation is valid based on the validation rules;

based on the first validation status, determining whether to process the second network operation with a target software application;

in response to determining to process the second network operation with the target software application, transmitting the second network operation to a node associated with the target software application; and in response to determining not to process the second network operation with target software application and in lieu of transmitting the second network operation to the node, executing a corrective action for the first software application.

9. The method of claim 8, wherein transmitting the second network operation to the node associated with the target software application comprises:
determining a system state comprising one or more predicted computational resource metric values for a set of nodes;
providing the second network operation, the system state, and the communication map to a routing model to determine the target software application; and
in response to determining the target software application, transmitting the second network operation to the node of the set of nodes.

10. The method of claim 8, wherein determining whether to process the second network operation with the target software application comprises:
providing the first network operation, the second network operation, and the communication map to the validation model to generate one or more anomaly indicators based on the validation rules,
wherein each anomaly indicator of the one or more anomaly indicators includes an indication of an anomaly type and a corresponding priority classification indicator;
generating the first validation status based on the one or more anomaly indicators; and
in response to generating the first validation status based on the one or more anomaly indicators, determining whether to process the second network operation with the target software application.

11. The method of claim 10, wherein executing the corrective action for the first software application comprises:
providing the first network operation, the second network operation, and the one or more anomaly indicators to a corrective action model to generate an indication of the corrective action in lieu of transmitting the second network operation to the node; and
in response to generating the indication of the corrective action, executing the corrective action.

12. The method of claim 8, further comprising:
obtaining, from the network operation database, training data comprising (i) indications of previous network operations and (ii) indications of associated computational resource metric values measuring system performance associated with the previous network operations; and
providing the training data to the validation model to train the validation model to generate validation statuses for network operations based on communication maps.

13. The method of claim 12, wherein obtaining the training data comprises generating the training data including the first network operation, the second network operation, and the first validation status.

14. The method of claim 8, wherein generating the communication map comprises:
generating, on a user interface associated with a user device, a graphical representation of the communication map,
wherein the graphical representation comprises graphical indications of the validation rules associated with the software applications of the set of software applications.

15. The method of claim 14, further comprising:
receiving, from the user interface associated with the user device, a rule modification request comprising (i) a selection of a graphical indication of a first validation rule of the graphical representation of the communication map and (ii) an indication of a rule modification; and
in response to receiving the rule modification request, modifying the first validation rule of the network operation database according to the rule modification.

16. The method of claim 8, wherein executing the corrective action for the first software application comprises:
determining, based on the first validation status, a mitigation protocol indicating a modification to the first network operation;
determining a first field associated with the first network operation;
determining a first value associated with the first field;
updating the first network operation by modifying the first value;
providing the updated first network operation to the first software application to cause generation of an updated second network operation as output; and
transmitting the updated second network operation to the node.

17. One or more non-transitory computer-readable media storing instructions that, when executed by one or more processors of a system, cause the system to:
detect a transmission of a first network operation from an originating software application to a first software application of a set of software applications, wherein (i) the first network operation is configured to receive an input network operation (ii) the first network operation is configured to be provided as input to the first software application and (iii) the first software application generates a second network operation as output, using the first network operation;
monitor a network operation database to generate a communication map comprising an indication of parent-child relationships between validation rules associated with software applications of the set of software applications;
provide the first network operation, the second network operation, and the communication map to a validation model to generate a first validation status indicating whether the second network operation is valid based on the validation rules;
based on the first validation status, determine whether to process the second network operation with a target software application;
in response to determining to process the second network operation with the target software application, transmit the second network operation to a node, of a set of nodes, associated with the target software application; and
in response to determining not to process the second network operation with target software application and in lieu of transmitting the second network operation to the node, execute a corrective action for the first software application.

18. The one or more non-transitory computer-readable media of claim 17, wherein the instructions for transmitting the second network operation to the node associated with the target software application cause the system to:
determine a system state comprising one or more predicted computational resource metric values for the set of nodes;

provide the second network operation, the system state, and the communication map to a routing model to determine the target software application; and in response to determining the target software application, transmit the second network operation to the node.

19. The one or more non-transitory computer-readable media of claim 17, wherein the instructions for determining whether to process the second network operation with the target software application cause the system to:

provide the first network operation, the second network operation, and the communication map to the validation model to generate one or more anomaly indicators based on the validation rules, wherein each anomaly indicator of the one or more anomaly indicators includes an indication of an anomaly type and a corresponding priority classification indicator;

generate the first validation status based on the one or more anomaly indicators; and in response to generating the first validation status based on the one or more anomaly indicators, determine whether to process the second network operation with the target software application.

20. The one or more non-transitory computer-readable media of claim 19, wherein the instructions for executing the corrective action for the first software application cause the system to:

provide the first network operation, the second network operation, and the one or more anomaly indicators to a corrective action model to generate an indication of the corrective action in lieu of transmitting the second network operation to the node; and in response to generating the indication of the corrective action, execute the corrective action.

* * * * *